(12) United States Patent
Balamane et al.

(10) Patent No.: US 6,662,432 B2
(45) Date of Patent: Dec. 16, 2003

(54) METHOD OF MAKING A FREE LAYER FOR A SPIN VALVE SENSOR WITH A LOWER UNIAXIAL ANISOTROPY FIELD

(75) Inventors: Hamid Balamane, Palo Alto, CA (US); Dwight Cornwell, Jr., Prunedale, CA (US); Hardayal Singh Gill, Portala Valley, CA (US); Serhat Metin, San Jose, CA (US); Mustafa Pinarbasi, Morgan Hill, CA (US)

(73) Assignee: International Business Machines Corporation, Armonk, NY (US)

( * ) Notice: Subject to any disclaimer, the term of this patent is extended or adjusted under 35 U.S.C. 154(b) by 331 days.

(21) Appl. No.: 09/753,823

(22) Filed: Jan. 2, 2001

(65) Prior Publication Data

US 2002/0126425 A1 Sep. 12, 2002

(51) Int. Cl.[7] .......................... G11B 5/127; H04R 31/00
(52) U.S. Cl. ................ 29/603.07; 29/603.13; 29/603.14; 29/603.27; 360/126; 360/324; 360/325; 360/326; 360/327
(58) Field of Search ................ 29/603.7, 603.13, 29/603.14, 603.27; 360/324–327, 126

(56) References Cited

U.S. PATENT DOCUMENTS

| | | | | |
|---|---|---|---|---|
| 5,920,446 A | * | 7/1999 | Gill | 360/324 |
| 5,974,657 A | * | 11/1999 | Fox et al. | 29/603.08 |
| 6,157,524 A | * | 12/2000 | Nakazawa et al. | 360/324.12 |
| 6,181,533 B1 | * | 1/2001 | Pokhil | 360/324 |
| 6,278,589 B1 | * | 8/2001 | Gill | 360/314 |
| 6,377,423 B2 | * | 4/2002 | Dill et al. | 360/126 |
| 6,400,536 B1 | * | 6/2002 | Gill | 360/324.12 |
| 6,407,890 B1 | * | 6/2002 | Gill | 360/314 |
| 6,425,989 B1 | * | 7/2002 | Westwood | 204/192.2 |
| 6,437,950 B1 | * | 8/2002 | Chau et al. | 360/324.11 |
| 6,460,243 B1 | * | 10/2002 | Pinarbasi | 29/603.14 |

* cited by examiner

*Primary Examiner*—Peter Vo
*Assistant Examiner*—Paul D Kim
(74) *Attorney, Agent, or Firm*—Ervin F. Johnston

(57) ABSTRACT

A free layer for a spin valve sensor includes a cobalt iron (CoFe) film which has an easy axis oriented perpendicular to an air bearing surface (ABS) of a read head and a nickel iron (NiFe) film which has an easy axis oriented parallel to the ABS and parallel to the major planes of the thin film layers. In a further embodiment the free layer is annealed at a high temperature in the presence of a field which is oriented perpendicular to the ABS.

13 Claims, 15 Drawing Sheets

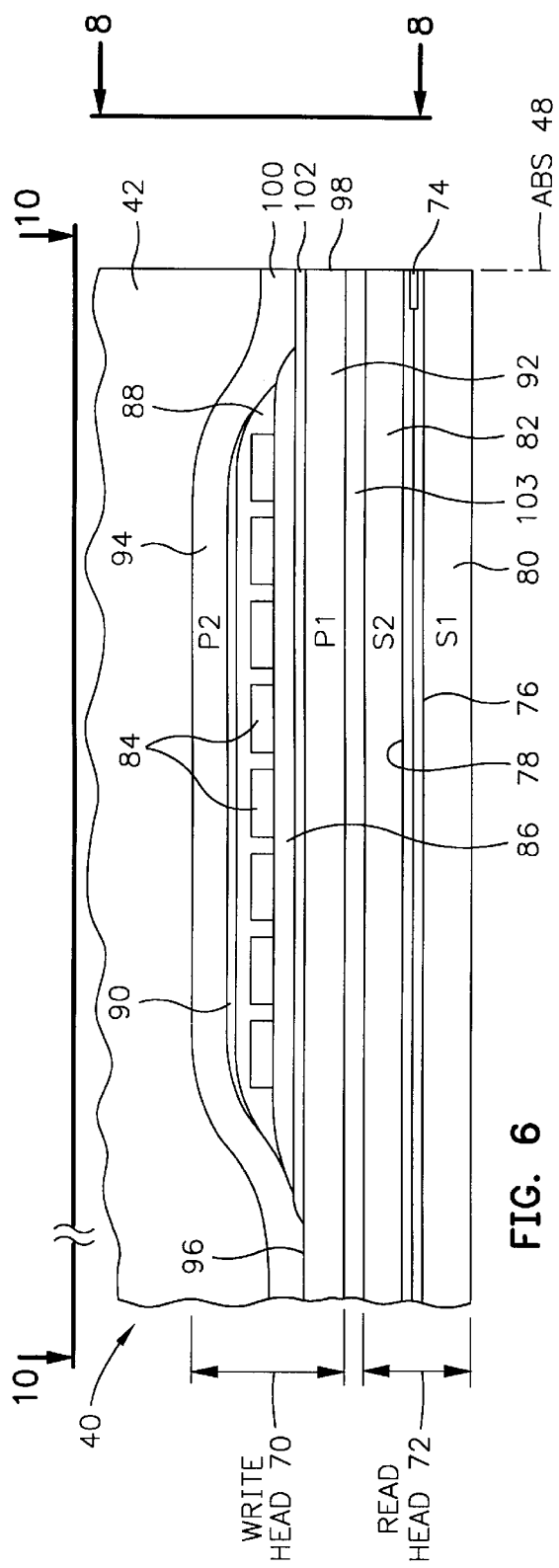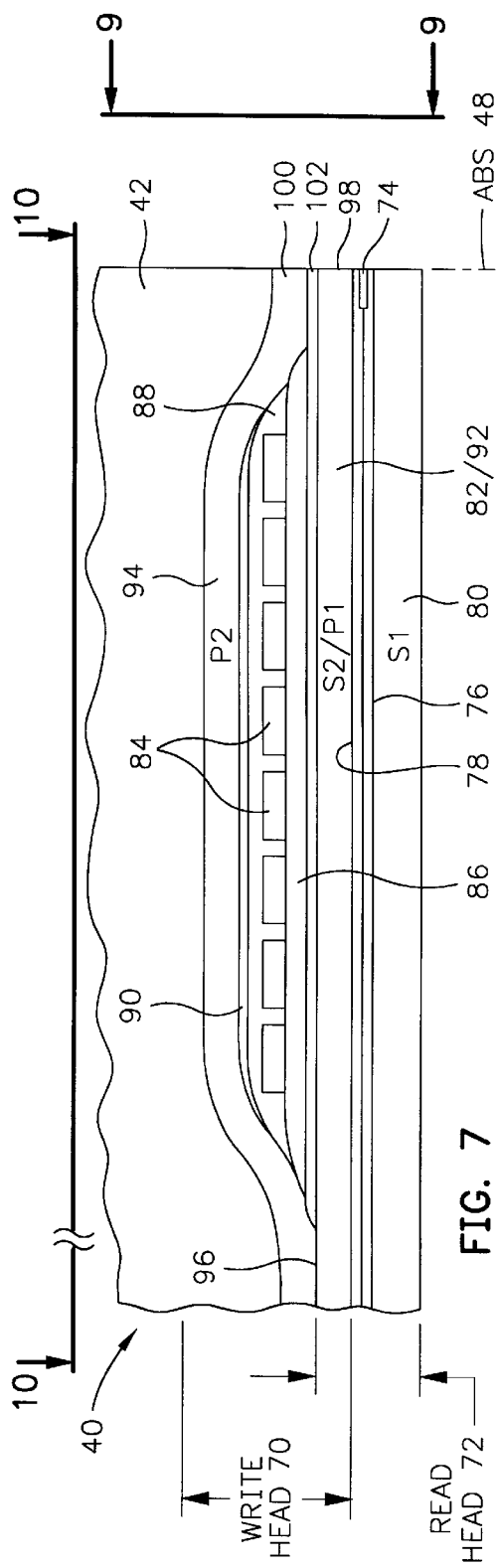

(ABS)

METHOD OF MAKING A FREE LAYER FOR A SPIN VALVE SENSOR WITH A LOWER UNIAXIAL ANISOTROPY FIELD

BACKGROUND OF THE INVENTION

1. Field of the Invention

The present invention relates to a free layer for a spin valve sensor with lower uniaxial anisotropy field and a method of making and, more particularly, to a free layer with employs a combination of nickel iron (NiFe) and cobalt iron (CoFe) films.

2. Description of the Related Art

The heart of a computer is an assembly that is referred to as a magnetic disk drive. The magnetic disk drive includes a rotating magnetic disk, a slider that has read and write heads, a suspension arm above the rotating disk and an actuator that swings the suspension arm to place the read and write heads over selected circular tracks on the rotating disk. The suspension arm biases the slider into contact with the surface of the disk when the disk is not rotating but, when the disk rotates, air is swirled by the rotating disk adjacent an air bearing surface (ABS) of the slider causing the slider to ride on an air bearing a slight distance from the surface of the rotating disk. When the slider rides on the air bearing the write and read heads are employed for writing magnetic impressions to and reading signal fields from the rotating disk. The read and write heads are connected to processing circuitry that operates according to a computer program to implement the writing and reading functions.

The write head includes a coil layer embedded in first, second and third insulation layers (insulation stack), the insulation stack being sandwiched between first and second pole piece layers. A gap is formed between the first and second pole piece layers by a nonmagnetic gap layer at an air bearing surface (ABS) of the write head. The pole piece layers are connected at a back gap. Current conducted to the coil layer induces a magnetic field into the pole pieces that fringes across the gap between the pole pieces at the ABS. The fringe field writes information in the form of the aforementioned magnetic impressions in circular tracks on the rotating disk.

An exemplary high performance read head employs a spin valve sensor for sensing magnetic signal fields from the rotating magnetic disk. The sensor includes a nonmagnetic electrically conductive first spacer layer sandwiched between a ferromagnetic pinned layer and a ferromagnetic free layer. An antiferromagnetic pinning layer interfaces the pinned layer for pinning the magnetic moment of the pinned layer 90° to an air bearing surface (ABS) which is an exposed surface of the sensor that faces the rotating disk. First and second leads are connected to the spin valve sensor for conducting a sense current therethrough. A magnetic moment of the free layer is free to rotate upwardly and downwardly with respect to the ABS from a quiescent or zero bias point position in response to positive and negative magnetic signal fields from the rotating magnetic disk. The quiescent position of the magnetic moment of the free layer, which is preferably parallel to the ABS, is when the sense current is conducted through the sensor without magnetic field signals from the rotating magnetic disk. If the quiescent position of the magnetic moment is not parallel to the ABS the positive and negative responses of the free layer will not be equal which results in read signal asymmetry which is discussed in more detail hereinbelow.

The thickness of the spacer layer is chosen so that shunting of the sense current and a magnetic coupling between the free and pinned layers are minimized. This thickness is typically less than the mean free path of electrons conducted through the sensor. With this arrangement, a portion of the conduction electrons is scattered by the interfaces of the spacer layer with the pinned and free layers. When the magnetic moments of the pinned and free layers are parallel with respect to one another scattering is minimal and when their magnetic moments are antiparallel scattering is maximized. An increase in scattering of conduction electrons increases the resistance of the spin valve sensor and a decrease in scattering of the conduction electrons decreases the resistance of the spin valve sensor. Changes in resistance of the spin valve sensor is a function of $\cos \theta$, where $\theta$ is the angle between the magnetic moments of the pinned and free layers.

The sensitivity of the sensor is quantified as magnetoresistance or magnetoresistive coefficient dr/R where dr is the change in resistance of the spin valve sensor from minimum resistance (magnetic moments of free and pinned layers parallel) to maximum resistance (magnetic moments of the free and pinned layers antiparallel) and R is the resistance of the spin valve sensor at minimum resistance. A spin valve sensor is sometimes referred to as a giant magnetoresistive (GMR) sensor. The sensitivity of a spin valve sensor depends upon the response of the free layer to signal fields from a rotating magnetic disk. The magnetic moment of the free layer depends upon the material or materials employed for the free layer. As the magnetic moment of the free layer increases the responsiveness of the free layer decreases. This means that for a given signal field from the rotating magnetic disk the magnetic moment of the free layer will not rotate as far from its parallel position to the ABS which causes a reduction in signal output.

In order to improve the sensitivity of the spin valve sensor a soft magnetic material, such as nickel iron (NiFe), is employed for the free layer. It has been found, however, that when the free layer employs a cobalt based film in addition to the nickel iron (NiFe) film that the magnetoresistive coefficient dr/R increases when the cobalt based film is located between and interfaces the nickel iron (NiFe) film and the copper (Cu) spacer layer. A cobalt based film, such as cobalt (Co) or cobalt iron (CoFe), has a magnetic moment of approximately 1.7 times the magnetic moment of nickel iron (NiFe) for a given thickness. The addition of a cobalt or cobalt based film increases the stiffness (uniaxial anisotropy field $H_K$) of the free layer in its response to signal fields and reduces the sensitivity of the spin valve sensor. Uniaxial anisotropy field is the amount field required to rotate the magnetic moment of the free layer from a position pararallel to the ABS to a position perpendicular thereto. Further, the cobalt based material causes the free layer structure to have a hysteresis. This hysteresis is indicated in a hysteresis loop which is a graph of the magnetic moment M of the free layer in response to an applied field H (signal field) directed perpendicular to the ABS. The hysteresis loop, which is referred to as the hard axis loop, has an opening due to the hysteresis which can be on the order of 5 to 7 oersteds. The opening in the hard axis loop is quantified as hard axis coercivity $H_C$ which is measured from the origin of the x and y axes to the intersection of the loop with the x axis (applied signal). It has been found that when the hard axis coercivity is high the head generates Barkhausen noise which is due to the fact that the magnetic domains of the cobalt based layer are oriented in different directions. Accordingly, as the signal fields rotate the magnetic moment of the free layer some of the magnetic domains do not follow the directions of the signal fields. The magnetic domains that do not readily follow the signal field direction follow behind the signal field direction in an erratic behavior, referred to as jumps in their movements, which causes the aforementioned Barkhausen noise. This Barkhausen noise is superimposed upon the playback signal which is unacceptable.

In order to keep the hard axis coercivity at an acceptable low level, very thin cobalt based films can be employed, such as 2 Å thick. While a 2 Å thick cobalt based layer produces some improvement in the magnetoresistive coefficient dr/R, it has been found that thicker cobalt based films will further increase the magnetoresistive coefficient dr/R. Considering all factors, including sense current shunting, a cobalt based layer on the order of 15 Å produces the highest magnetoresistive coefficient dr/R. Unfortunately, a cobalt based layer of this thickness causes the free layer structure to have a hard axis coercivity which unacceptably reduces the sensitivity of the read head to signal fields and produces Barkhausen noise. Accordingly, it would be desirable if cobalt based films thicker than 2 Å could be employed in a free layer structure without the aforementioned problems of responsiveness to signal fields and the production of Barkhausen noise. If the hysteresis or opening in the hard axis loop is eliminated the aforementioned moment versus applied field graph (M/H graph) of the responsiveness of the spin valve sensor would be simply a straight line. This straight line, which is the transfer curve of the read head, indicates that the read head will be magnetically stable upon the application of the signal fields.

In a read head application, the uniaxial anisotropy field and the hard axis loop of the free layer structure has to be determined after the free layer is subjected to annealing at a high temperature for a period of time. This is due to the fact that during the fabrication of a read/write head combination the aforementioned first, second and third insulation layers are baked photoresist. After spinning a photoresist layer onto a wafer substrate and patterning it, the photoresist layer is annealed at a temperature of approximately 232° C. for a period of 6 hours. Accordingly, uniaxial anisotropy field and the hard axis loop for a free layer in a read head that is combined with a write head has meaning only after this annealing. The annealing is performed in the presence of a magnetic field which is oriented perpendicular to the ABS. This orientation is 90° to the desired orientation of the magnetic moment of the free layer. The orientation of the magnetic field perpendicular to the ABS is for the purpose of maintaining the orientation of the magnetic spins of the pinning layer. If the annealing temperature exceeds or is close to the blocking temperature of the materials employed for pinning layers the magnetic spins of the pinning material is free to move in response to any extraneous field. Any such movement would shift the magnetic moment of the pinned layer from the perpendicular position after the annealing is terminated which would destroy or seriously degrade the spin valve sensor. Unfortunately, the aforementioned annealing process increases the uniaxial anisotropy field and the coercivity making the free layer less responsive to signal fields.

SUMMARY OF THE INVENTION

The present invention provides a free layer for a spin valve sensor which has combined nickel iron (NiFe) and cobalt iron (CoFe) films with a lower uniaxial anisotropy field $H_K$ and a lower hard axis coercivity $H_{CH}$ after annealing than prior art such free layers after annealing. This has been accomplished by providing the cobalt iron (CoFe) film with a magnetic easy axis that is oriented perpendicular to the ABS and a nickel iron (NiFe) film with an easy axis that is oriented parallel to the ABS and parallel to the major planes of the thin film layers. The orientation of the easy axis of the nickel iron (NiFe) film is accomplished by sputter depositing nickel iron (NiFe) material in the presence of a field which is oriented parallel to the ABS and parallel to the major planes of the thin film surfaces. In a like manner, orientation of the easy axis of the cobalt iron (CoFe) is accomplished by sputter depositing cobalt iron (CoFe) in the presence of a field which is oriented perpendicular to the ABS. Surprisingly, after the sputter deposition, the uniaxial anisotropy field $H_K$ and the hard axis coercivity $H_{CH}$ of the free layer with the combined films are lowered by annealing the free layer at a high temperature in the presence of a field which is oriented perpendicular to the ABS. The annealing temperature was 232° C., which is the baking temperature used to harden photoresist layers of an insulation stack in the write head, in the presence of a field of 1,000 Oe, which is the field used to maintain orientation of the magnetic spins of the pinning layer in the spin valve sensor, for a period of 8 hours. After annealing the free layer the uniaxial anisotropy field $H_K$ was 5.3 Oe as compared to 9.37 Oe for a prior art annealed free layer and the hard axis coercivity $H_{CH}$ was 0.57 Oe as compared to 0.95 Oe for the prior art annealed free layer.

An object of the present invention is to provide a free layer, with a cobalt based film, which has improved uniaxial anisotropy field.

Another object is to provide a free layer, with a cobalt based film, which has improved uniaxial anisotropy field after annealing in presence of a magnetic field.

A further object is to provide a free layer, with nickel iron (NiFe) and cobalt iron (CoFe) films, which has improved uniaxial anisotropy field $H_K$ and improved hard axis coercivity $H_{CH}$ before and after annealing at a temperature sufficient to bake photoresist in an insulation stack of a write head in the presence of a magnetic field which is oriented perpendicular to the ABS in order to maintain orientation of the magnetic moment of a pinned layer in a spin valve sensor.

Still another object is to provide various methods of making the aforementioned spin valve sensors.

Other objects and advantages of the invention will become apparent upon reading the following description taken together with the accompanying drawings.

BRIEF DESCRIPTION OF THE DRAWINGS

FIG. 6 is a partial view of the slider and a piggyback magnetic head as seen in plane 6—6 of FIG. 2;

FIG. 7 is a partial view of the slider and a merged magnetic head as seen in plane 7—7 of FIG. 2;

DESCRIPTION OF THE PREFERRED EMBODIMENTS

Magnetic Disk Drive

Figure 1:
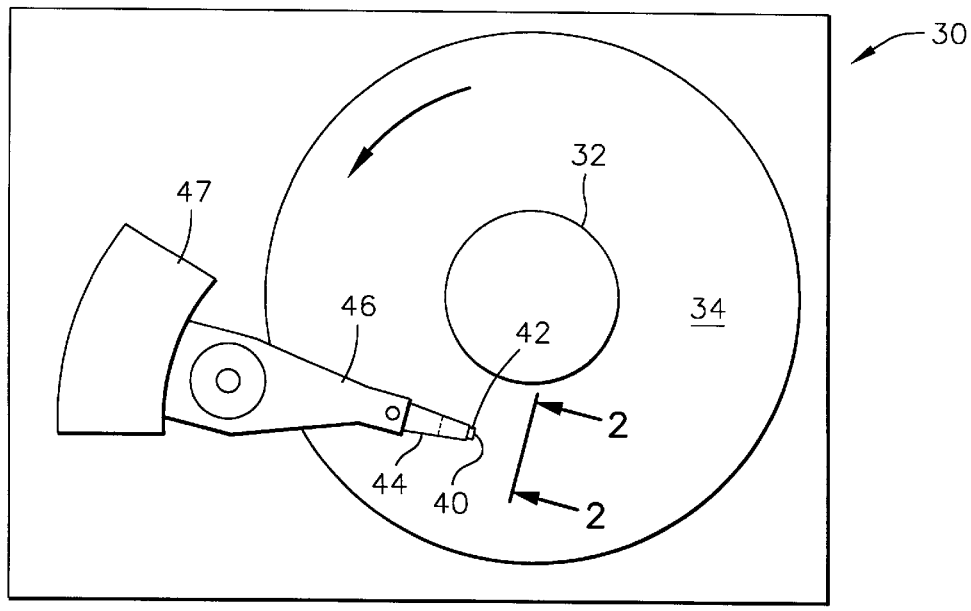
FIG. 1 is a plan view of an exemplary magnetic disk drive.
Figure 2:
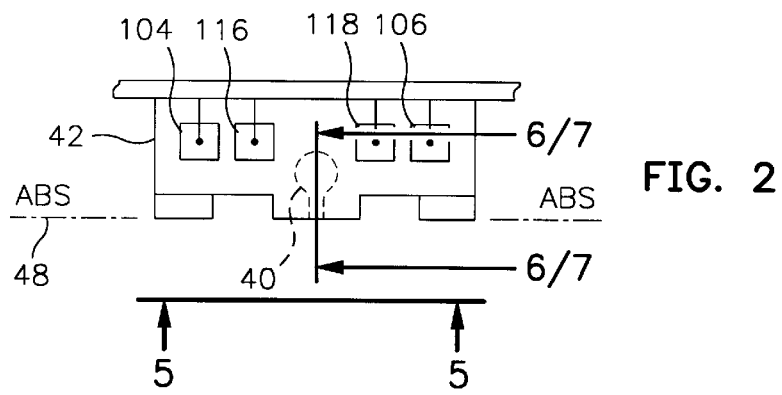
FIG. 2 is an end view of a slider with a magnetic head of the disk drive as seen in plane 2—2.
Figure 3:
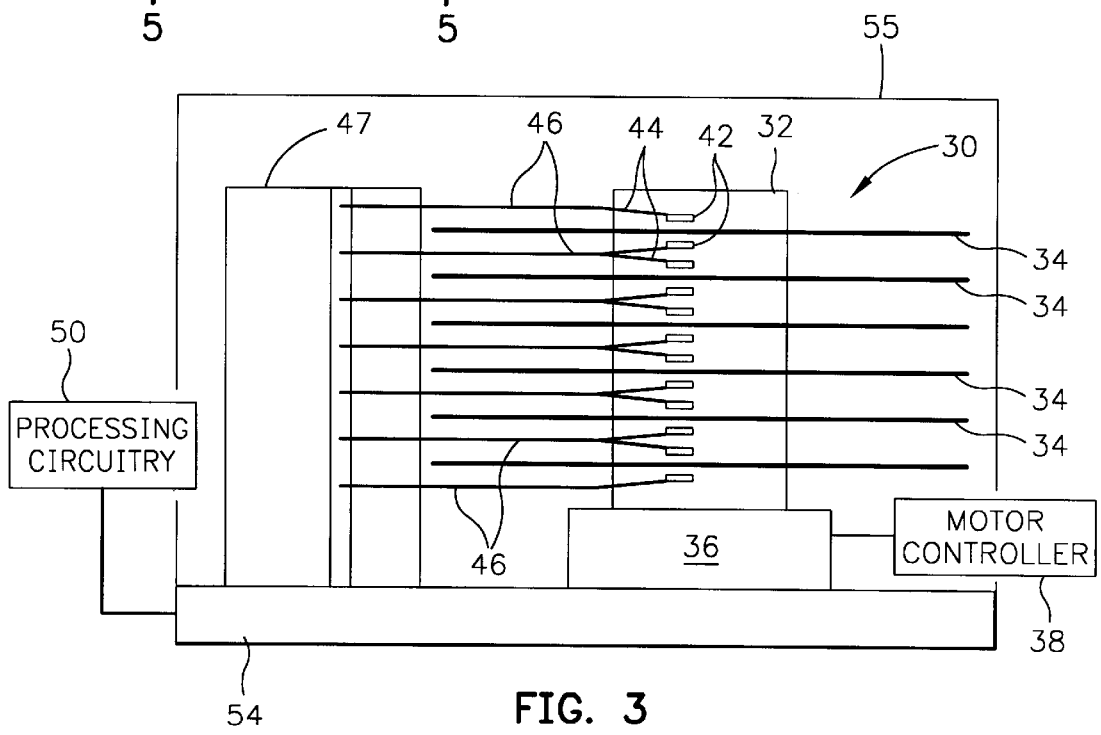
FIG. 3 is an elevation view of the magnetic disk drive wherein multiple disks and magnetic heads are employed.
Figure 4:
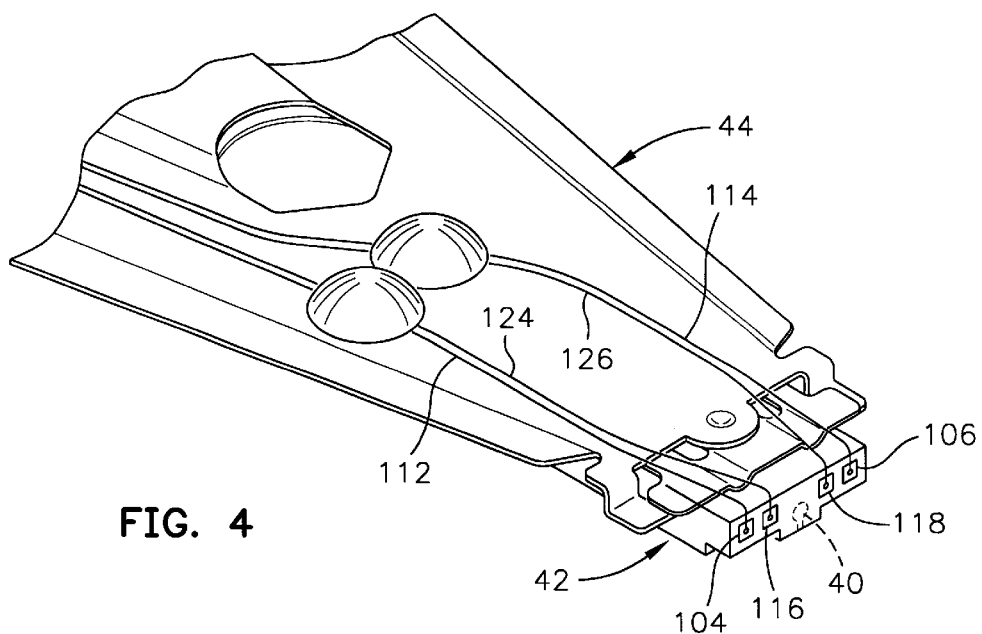
FIG. 4 is an isometric illustration of an exemplary suspension system for supporting the slider and magnetic head.

Referring now to the drawings wherein like reference numerals designate like or similar parts throughout the several views, FIGS. 1–3 illustrate a magnetic disk drive 30. The drive 30 includes a spindle 32 that supports and rotates a magnetic disk 34. The spindle 32 is rotated by a spindle motor 36 that is controlled by a motor controller 38. A slider 42 has a combined read and write magnetic head 40 and is supported by a suspension 44 and actuator arm 46 that is rotatably positioned by an actuator 47. A plurality of disks, sliders and suspensions may be employed in a large capacity direct access storage device (DASD) as shown in FIG. 3. The suspension 44 and actuator arm 46 are moved by the actuator 47 to position the slider 42 so that the magnetic head 40 is in a transducing relationship with a surface of the magnetic disk 34. When the disk 34 is rotated by the spindle motor 36 the slider is supported on a thin (typically, 0.05 $\mu$m) cushion of air (air bearing) between the surface of the disk 34 and the air bearing surface (ABS) 48. The magnetic head 40 may then be employed for writing information to multiple circular tracks on the surface of the disk 34, as well as for reading information therefrom. Processing circuitry 50 exchanges signals, representing such information, with the head 40, provides spindle motor drive signals for rotating the magnetic disk 34, and provides control signals to the actuator for moving the slider to various tracks. In FIG. 4 the slider 42 is shown mounted to a suspension 44. The components described hereinabove may be mounted on a frame 54 of a housing, as shown in FIG. 3.

Figure 5:
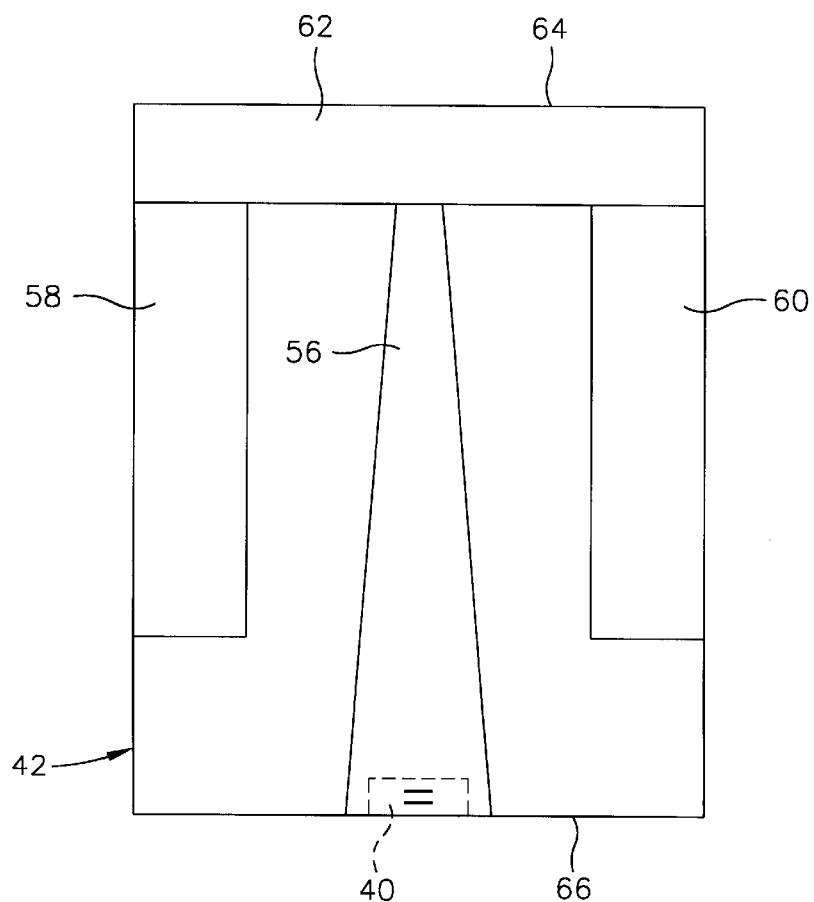
FIG. 5 is an ABS view of the magnetic head taken along plane 5—5 of FIG. 2.
Figure 10:
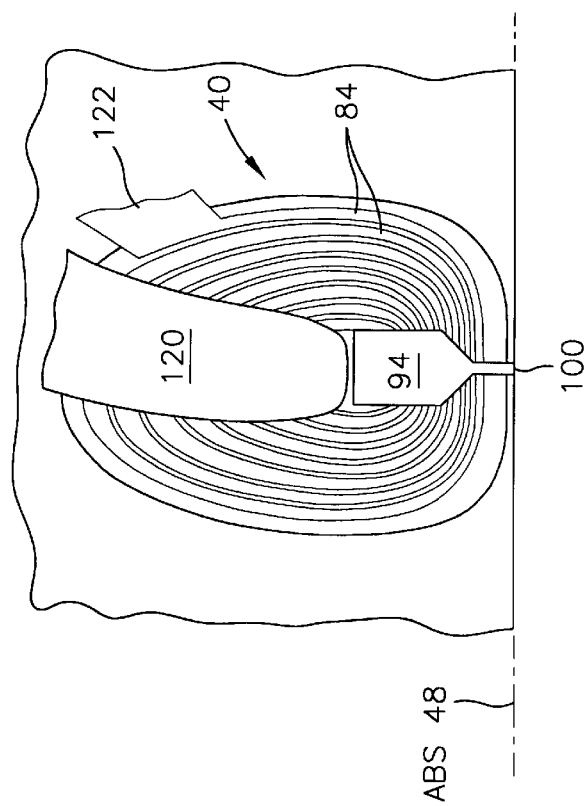
FIG. 10 is a view taken along plane 10—10 of FIG. 6 or 7 with all material above the coil layer and leads removed.

FIG. 5 is an ABS view of the slider 42 and the magnetic head 40. The slider has a center rail 56 that supports the magnetic head 40, and side rails 58 and 60. The rails 56, 58 and 60 extend from a cross rail 62. With respect to rotation of the magnetic disk 34, the cross rail 62 is at a leading edge 64 of the slider and the magnetic head 40 is at a trailing edge 66 of the slider.

Figure 8:
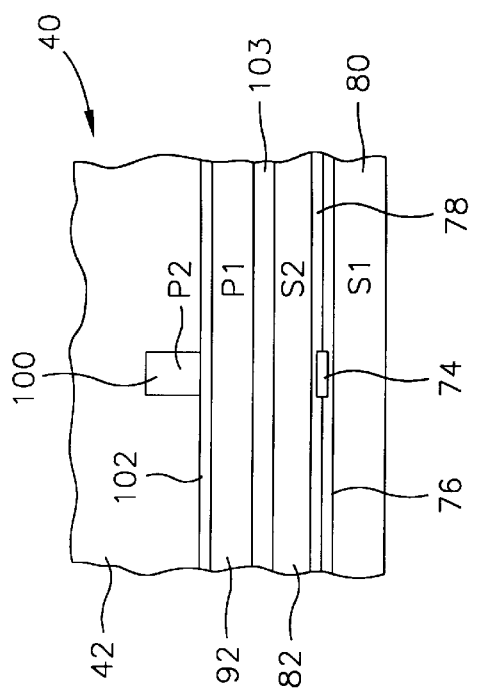
FIG. 8 is a partial ABS view of the slider taken along plane 8—8 of FIG. 6 to show the read and write elements of the piggyback magnetic head.

FIG. 6 is a side cross-sectional elevation view of a piggyback magnetic head 40, which includes a write head portion 70 and a read head portion 72, the read head portion employing a spin valve sensor 74 of the present invention. FIG. 8 is an ABS view of FIG. 6. The spin valve sensor 74 is sandwiched between nonmagnetic electrically insulative first and second read gap layers 76 and 78, and the read gap layers are sandwiched between ferromagnetic first and second shield layers 80 and 82. In response to external magnetic fields, the resistance of the spin valve sensor 74 changes. A sense current $I_S$ conducted through the sensor causes these resistance changes to be manifested as potential changes which are processed as readback signals by the processing circuitry 50 shown in FIG. 3.

The write head portion 70 of the magnetic head 40 includes a coil layer 84 sandwiched between first and second insulation layers 86 and 88. A third insulation layer 90 may be employed for planarizing the head to eliminate ripples in the second insulation layer caused by the coil layer 84. The first, second and third insulation layers are referred to in the art as an "insulation stack". The coil layer 84 and the first, second and third insulation layers 86, 88 and 90 are sandwiched between first and second pole piece layers 92 and 94. The first and second pole piece layers 92 and 94 are magnetically coupled at a back gap 96 and have first and second pole tips 98 and 100 which are separated by a write gap layer 102 at the ABS. An insulation layer 103 is located between the second shield layer 82 and the first pole piece layer 92. Since the second shield layer 82 and the first pole piece layer 92 are separate layers this head is known as a piggyback head. As shown in FIGS. 2 and 4, first and second solder connections 104 and 106 connect leads from the spin valve sensor 74 to leads 112 and 114 on the suspension 44, and third and fourth solder connections 116 and 118 connect leads 120 and 122 from the coil 84 (see FIG. 8) to leads 124 and 126 on the suspension.

Figure 9:
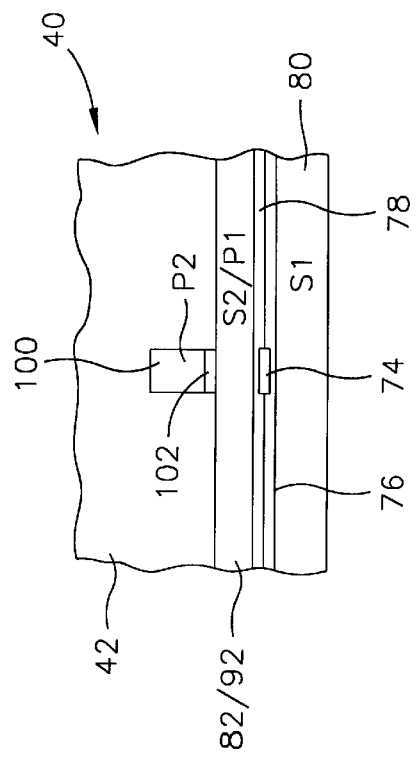
FIG. 9 is a partial ABS view of the slider taken along plane 9—9 of FIG. 7 to show the read and write elements of the merged magnetic head.

FIGS. 7 and 9 are the same as FIGS. 6 and 8 except the second shield layer 82 and the first pole piece layer 92 are a common layer. This type of head is known as a merged magnetic head. The insulation layer 103 of the piggyback head in FIGS. 6 and 8 is omitted.

Figure 11:
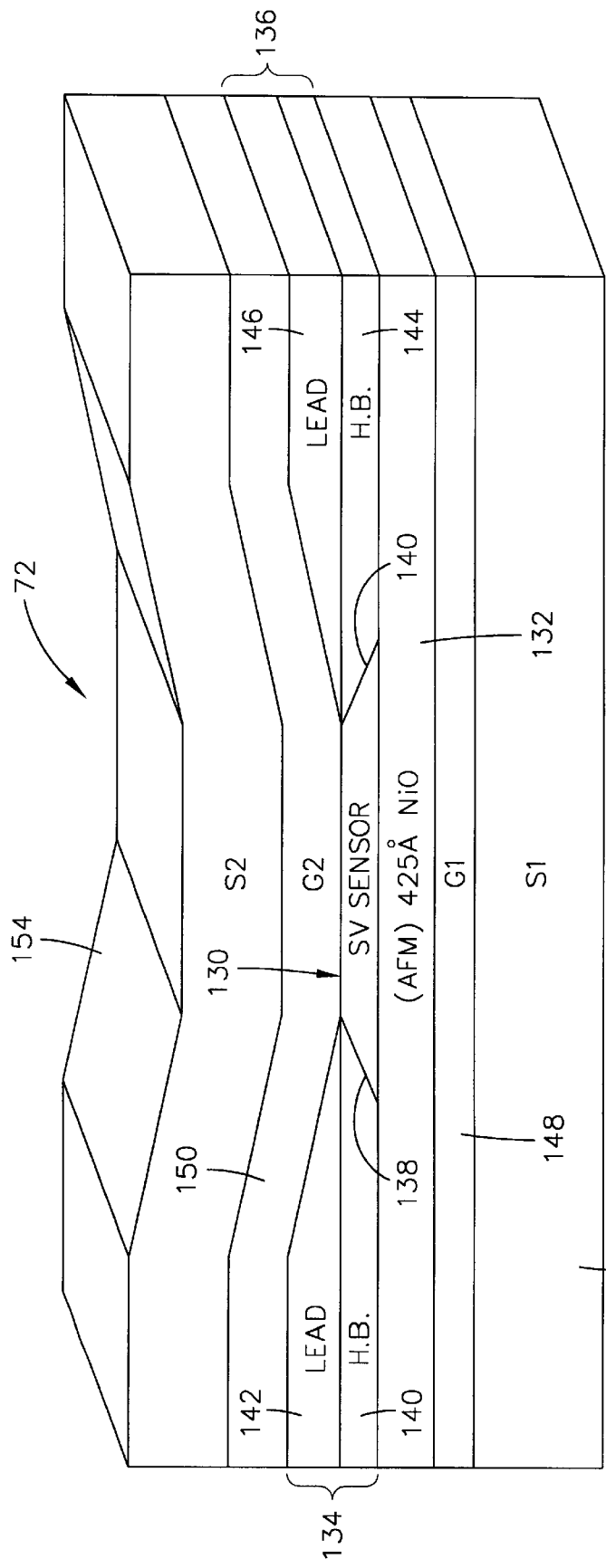
FIG. 11 is an isometric ABS illustration of a read head which employs the present spin valve sensor.

FIG. 11 is an isometric ABS illustration of the read head 72 shown in FIG. 6 or 8. The read head 72 includes the present spin valve sensor 130 which is located on an antiferromagnetic (AFM) pinning layer 132. A ferromagnetic pinned layer in the spin valve sensor 130, which is to be described hereinafter, is pinned by the magnetic spins of the pinning layer 132. The AFM pinning layer may be 425 Å of nickel oxide (NiO). First and second hard bias and lead layers 134 and 136 are connected to first and second side edges 138 and 140 of the spin valve sensor. This connection is known in the art as a contiguous junction and is fully described in commonly assigned U.S. Pat. No. 5,018,037 which is incorporated by reference herein. The first hard bias and lead layers 134 include a first hard bias layer 140 and a first lead layer 142 and the second hard bias and lead layers 136 include a second hard bias layer 144 and a second lead layer 146. The hard bias layers 140 and 144 cause magnetic fields to extend longitudinally through the spin valve sensor 130 for stabilizing the magnetic domains therein. The AFM pinning layer 132, the spin valve sensor 130 and the first and second hard bias and lead layers 134 and 136 are located between nonmagnetic electrically insulative first and second read gap layers 148 and 150. The first and second read gap layers 148 and 150 are, in turn, located between ferromagnetic first and second shield layers 152 and 154.

Figure 12:
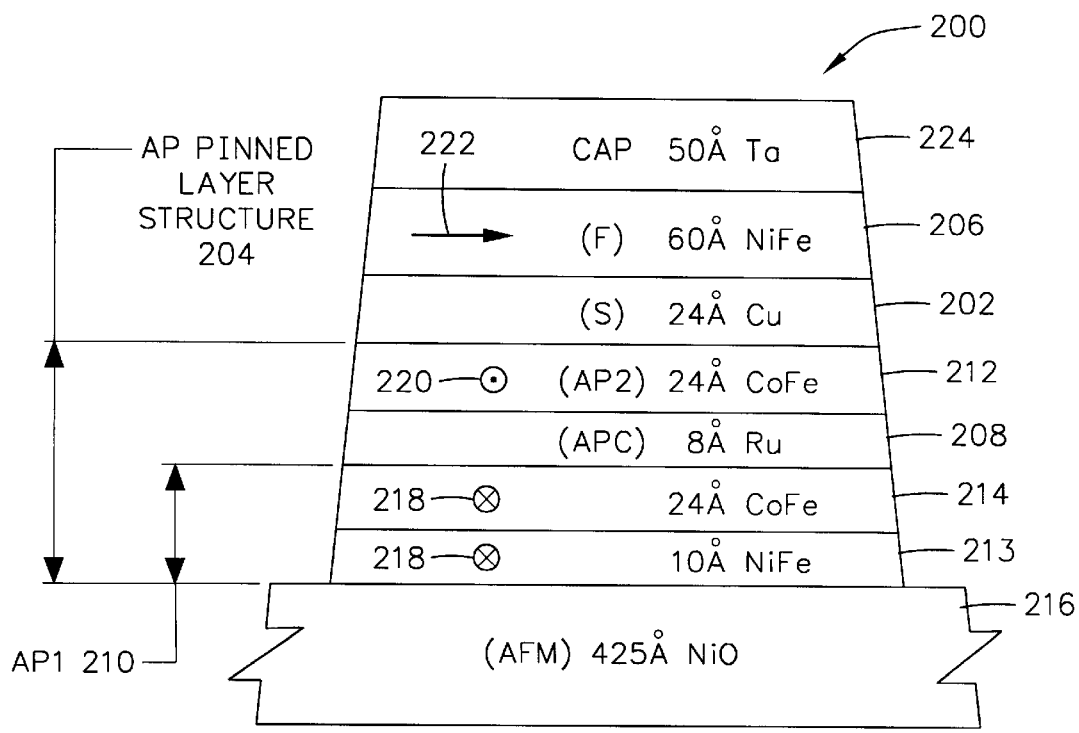
FIG. 12 is an ABS illustration of a spin valve sensor with a free layer which has only a nickel iron (NiFe) film which was tested.

An example of a spin valve sensor 200 tested is shown in FIG. 12. The sensor 200 includes a nonmagnetic electrically conductive spacer layer 202 which is located between an antiparallel (AP) pinned layer structure 204 and a free layer 206. The AP pinned layer structure 204 includes an antiparallel coupling (APC) layer 208 which is located between first and second antiparallel layers (AP1) and (AP2) 210 and 212 wherein the first AP pinned layer includes first and second films 213 and 214 and the second AP pinned layer 212 is a single layer. A pinning layer 216 pins a magnetic moment 218 of the first AP pinned layer (AP1) 210 which, in turn, by a strong antiparallel coupling, pins a magnetic moment 220 of the second AP pinned layer (AP2) 212 antiparallel thereto. Magnetic moments 218 and 220 are directed perpendicular to the ABS in a direction either toward or away from the ABS. The free layer 206 has a magnetic moment 222 which is directed parallel to the ABS and rotates upwardly or downwardly in response to signal fields from a rotating magnetic disk. When a signal field rotates the magnetic moment 222 upwardly into the sensor the resistance of the spin valve sensor increases and when the signal field rotates the magnetic moment 222 downwardly the resistance of the spin valve sensor decreases so that when the sense current $I_S$ is conducted through the spin valve sensor potential changes due to the resistance changes are processed by the processing circuitry 50 in FIG. 3 as playback signals. A cap layer 224 is located on the sensor to protect the free layer from subsequent processing steps.

The thicknesses and materials of the layers of the spin valve sensor are 425 Å of nickel oxide (NiO) for the pinning layer 216, 10 Å of nickel iron (NiFe) for the film 213, 24 Å of cobalt iron (CoFe) for the film 214, 8 Å of ruthenium (Ru) for the antiparallel coupling layer 208, 24 Å of cobalt iron (CoFe) for the second AP pinned layer 212, 24 Å of copper (Cu) for the spacer layer 202, 60 Å of nickel iron (NiFe) for the free layer 206 and 50 Å of tantalum for the cap layer 224.

Figure 13:
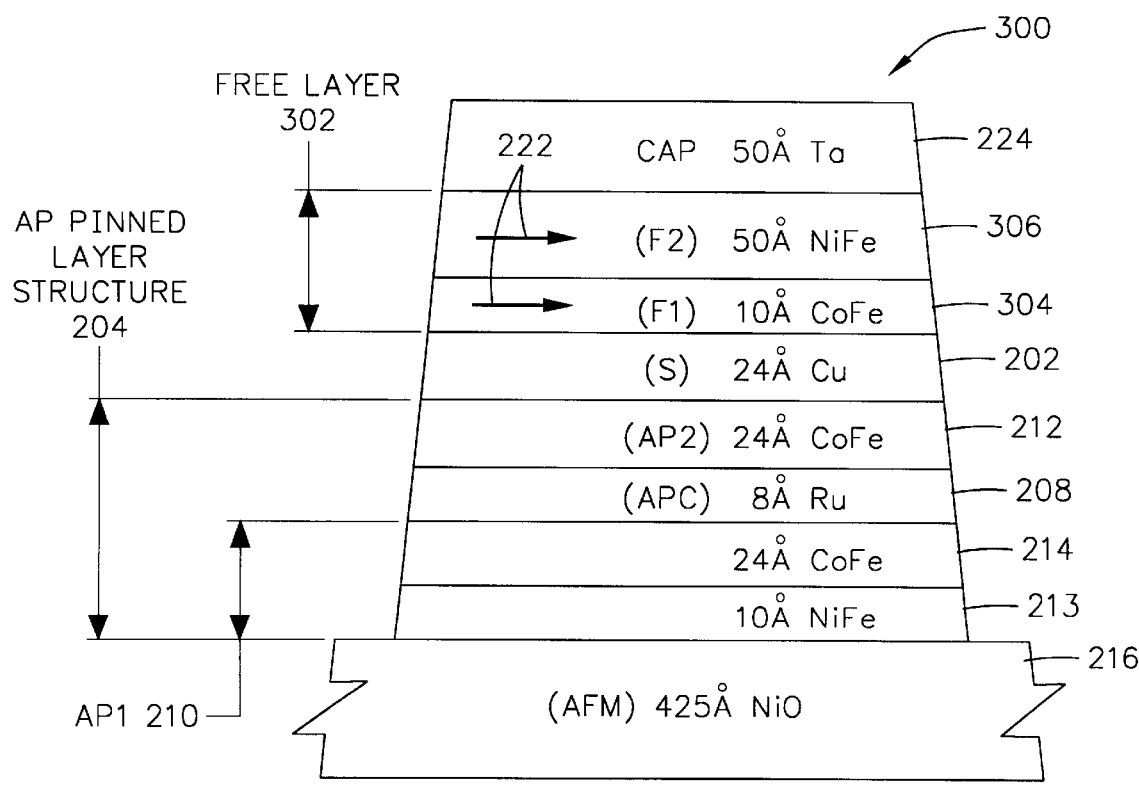
FIG. 13 is an ABS illustration, which is the same as FIG. 12, except the free layer has a cobalt iron (CoFe) film in addition to a nickel iron (NiFe) film, which was tested.

Another example of a spin valve sensor 300 tested is shown in FIG. 13. The spin valve sensor 300 is the same as the spin valve sensor 200 in FIG. 12 except the spin valve sensor 300 has a free layer 302 instead of the free layer 206. The free layer 302 includes a first free film (F1) 304, which was 10 Å of cobalt iron (CoFe), and a second free film (F2) 306 which was 50 Å of nickel iron (NiFe).

EXAMPLE 1

Figure 14:
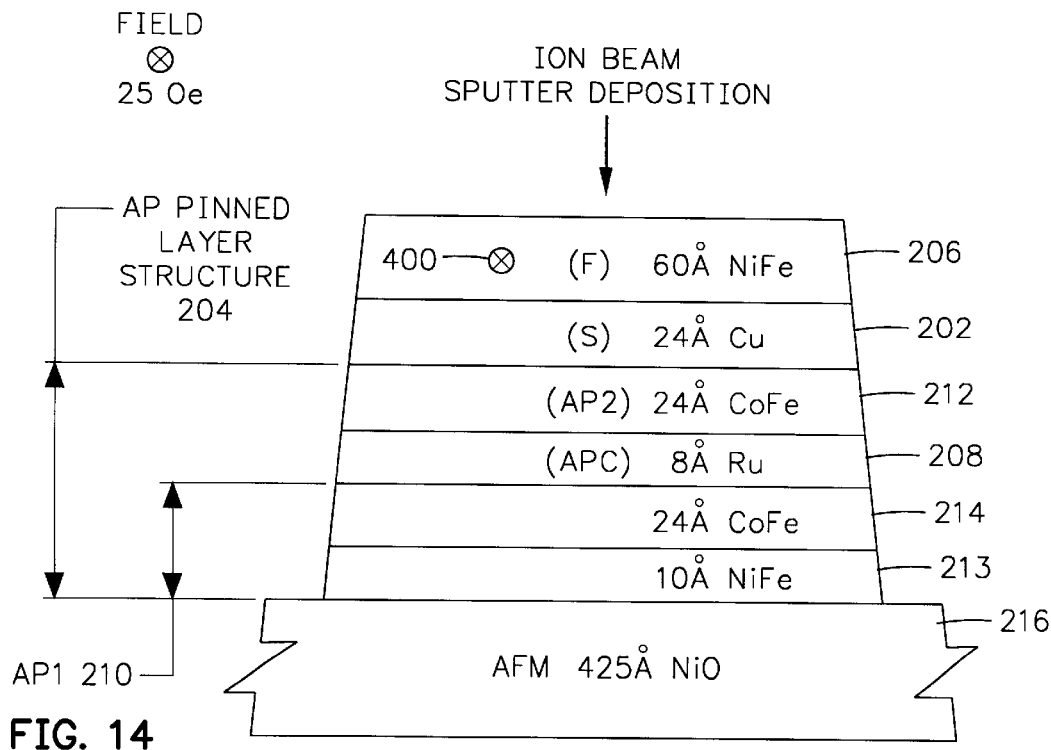
FIG. 14 shows the sputter deposition of the nickel iron (NiFe) film of the free layer of the spin valve sensor in FIG. 12.

After depositing the various layers below the free layer 206 in FIG. 12 the nickel iron (NiFe) film 206 of the free layer was sputter deposited by ion beam deposition, as shown in FIG. 14, in the presence of a field of 25 Oe which is oriented perpendicular to the ABS. This causes the free layer 206 to have a magnetic easy axis 400 which is oriented perpendicular to the ABS. As shown in column 1 of Table I hereinbelow, the uniaxial anisotropy field $H_K$ was 2.28 Oe, the easy axis coercivity $H_C$ was 1 Oe and the hard axis coercivity $H_{CH}$ was 0.33 Oe. These are very favorable values, however, the free layer does not employ a cobalt iron (CoFe) film which has been found to be desirable for increasing the magnetoresistive coefficient dr/R of the spin valve sensor.

EXAMPLE 2

Figure 15:
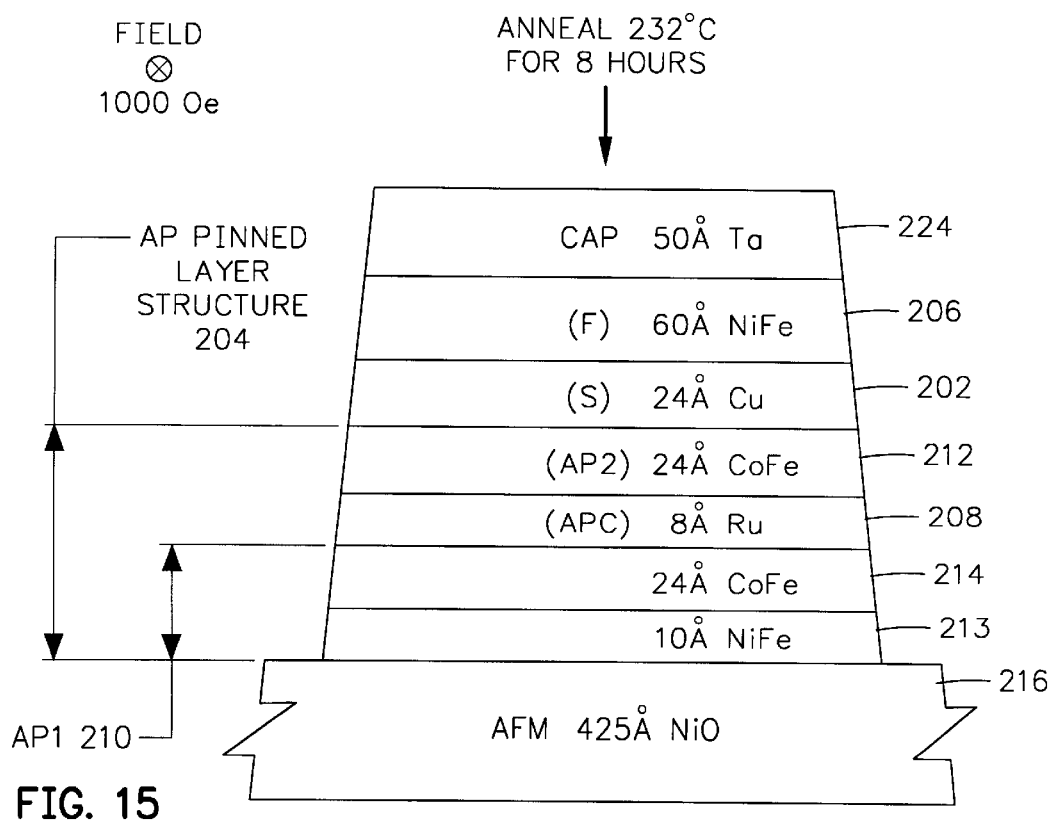
FIG. 15 shows the annealing of the spin valve sensor in FIG. 14 in the presence of a field oriented perpendicular to the ABS.

As shown in FIG. 15, the spin valve sensor in FIG. 14 was subjected to annealing at 232° C. for a period of 8 hours in the presence of a field of 1000 Oe oriented perpendicular to the ABS. As shown in column 1 of Table II hereinbelow, the uniaxial anisotropy field $H_K$ was 3.75 Oe, the easy axis coercivity was 1.1 Oe and the hard axis coercivity was 0.3 Oe. It can be seen that this annealing with the field oriented perpendicular to the ABS caused the uniaxial anisotropy field $H_K$ to increase from 2.28 Oe to 3.75 Oe while the easy axis coercivity $H_C$ and the hard axis coercivity $H_{CH}$ remained approximately the same.

EXAMPLE 3

Figure 16:
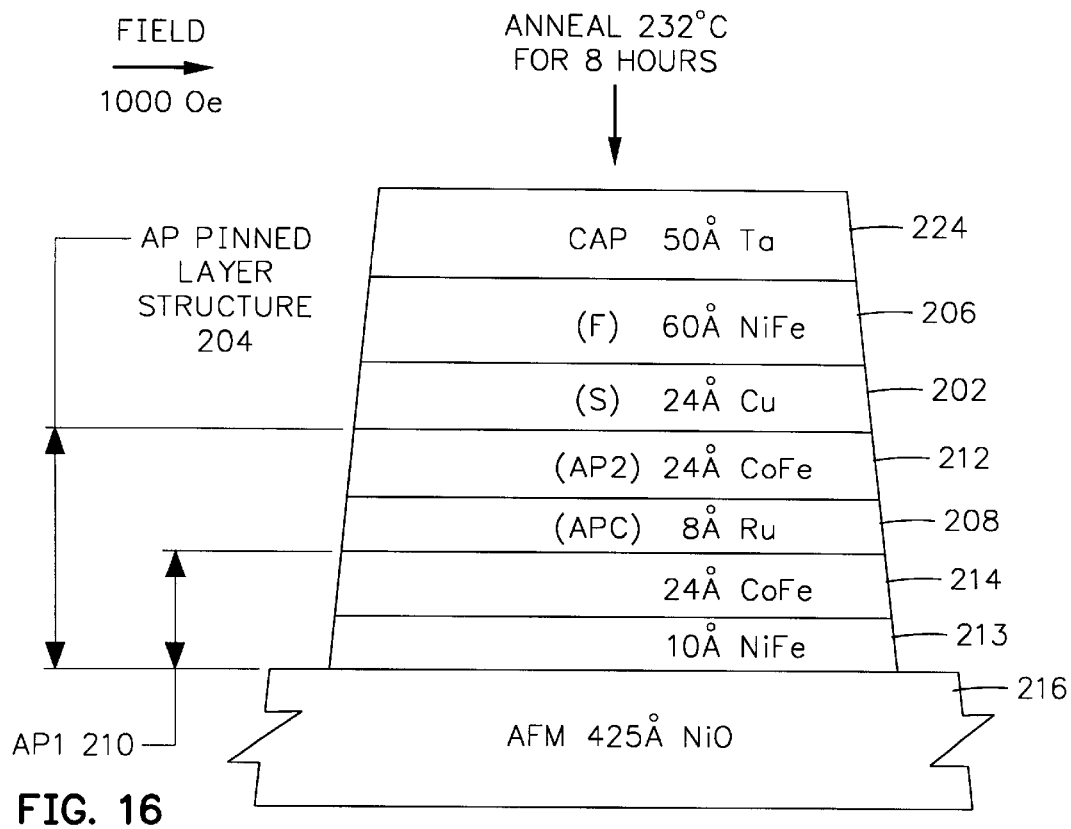
FIG. 16 shows the annealing of the spin valve sensor shown in FIG. 14 in the presence of a field oriented parallel to the ABS.

As shown in FIG. 16, the spin valve sensor in FIG. 14 was annealed at a temperature of 232° C. for a period of 8 hours in the presence of a field of 1000 Oe oriented parallel to the ABS. The uniaxial anisotropy field $H_K$ was 2.75 Oe, the easy axis coercivity was 0.9 Oe and the hard axis coercivity $H_{CH}$ was 0.2 Oe, as shown in column 1 of Table III hereinbelow. It can be seen from Example 3 that when the spin valve sensor in FIG. 14 is annealed in the presence of a field oriented parallel to the ABS that the uniaxial anisotropy field $H_K$ is improved as compared to Example 2 which increased from 2.28 Oe, as deposited in Example 1, to 2.75 Oe.

EXAMPLE 4

Figure 17:
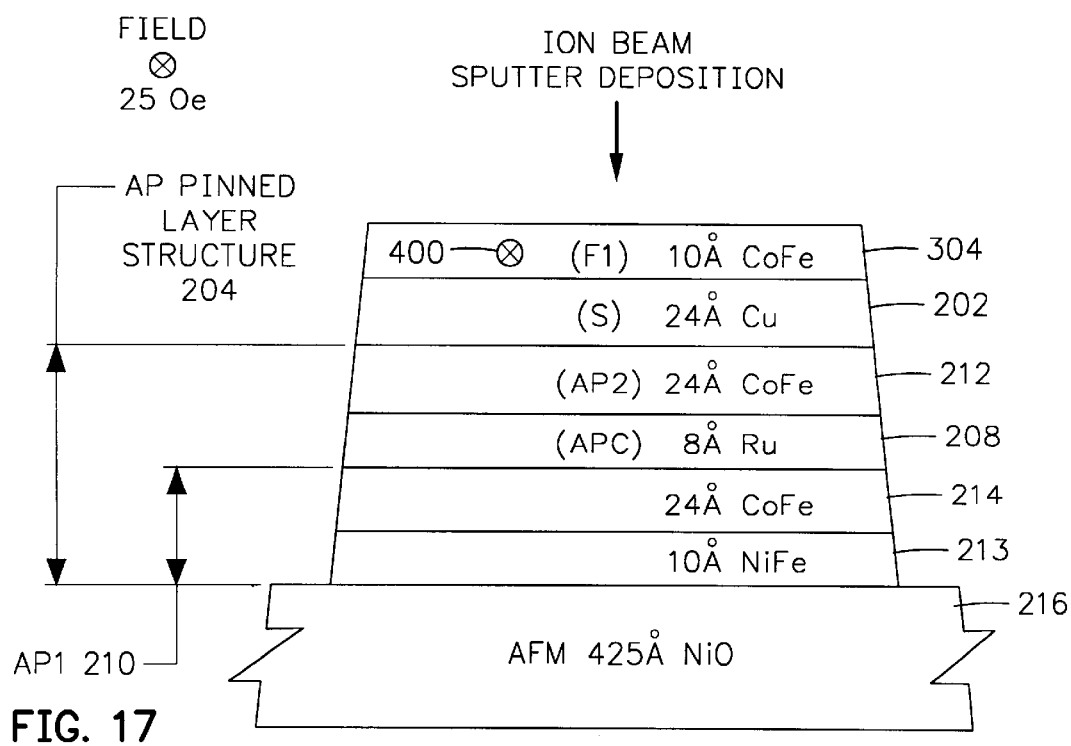
FIG. 17 shows the sputter deposition of the cobalt iron (CoFe) film of the free layer of the spin valve sensor shown in FIG. 13.
Figure 18:
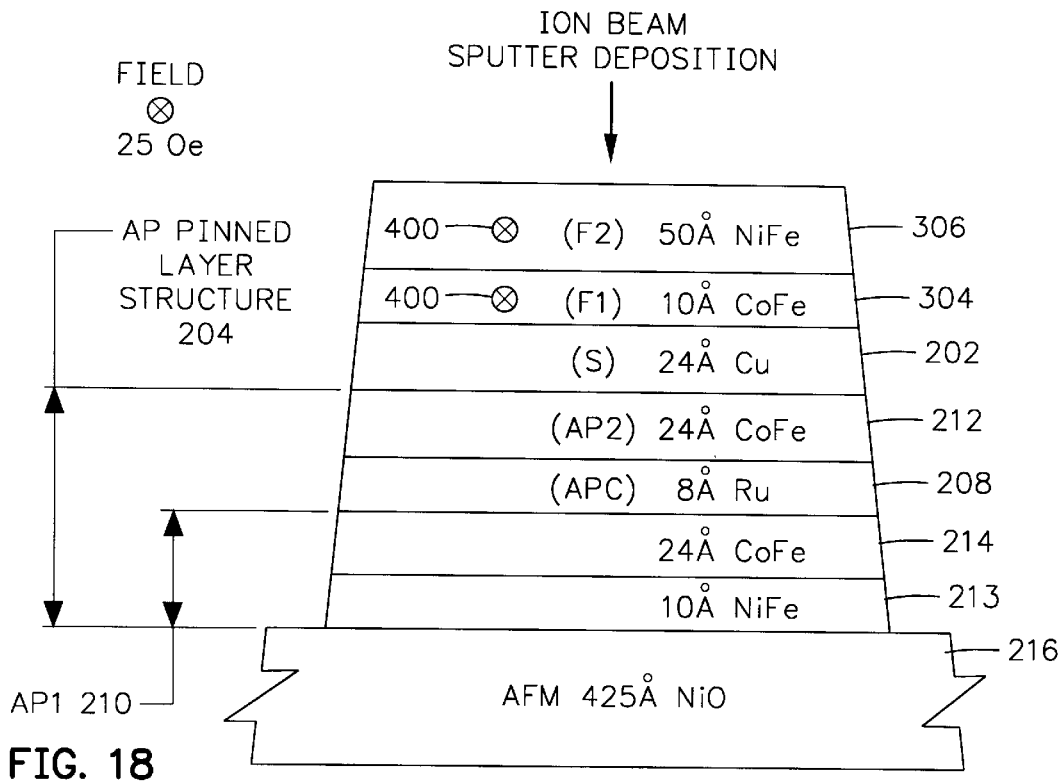
FIG. 18 shows the sputter deposition of the nickel iron (NiFe) film of the free layer shown in FIG. 17.

In FIG. 17 the cobalt iron (CoFe) film of the free layer was sputtered deposited in the presence of a field of 25 Oe oriented perpendicular to the ABS. Next, the nickel iron (NiFe) film of the free layer was sputter deposited, as shown in FIG. 18, in the presence of a field of 25 Oe oriented perpendicular to the ABS. It was found that this spin valve sensor before annealing had a uniaxial anisotropy field $H_K$ of 5.95 Oe, an easy axis coercivity $H_C$ of 2.1 Oe and a hard axis coercivity $H_{CH}$ of 0.95 Oe, as shown in column 2 of Table I. It can be seen that these values are significantly greater than the values tested in Example 1. This is due to the fact that the free layer contains a cobalt iron (CoFe) film which is desirable for increasing the magnetoresistive coefficient dr/R of the spin valve sensor. FIG. 17 illustrates the standard deposition technique for prior art free layers.

EXAMPLE 5

Figure 19:
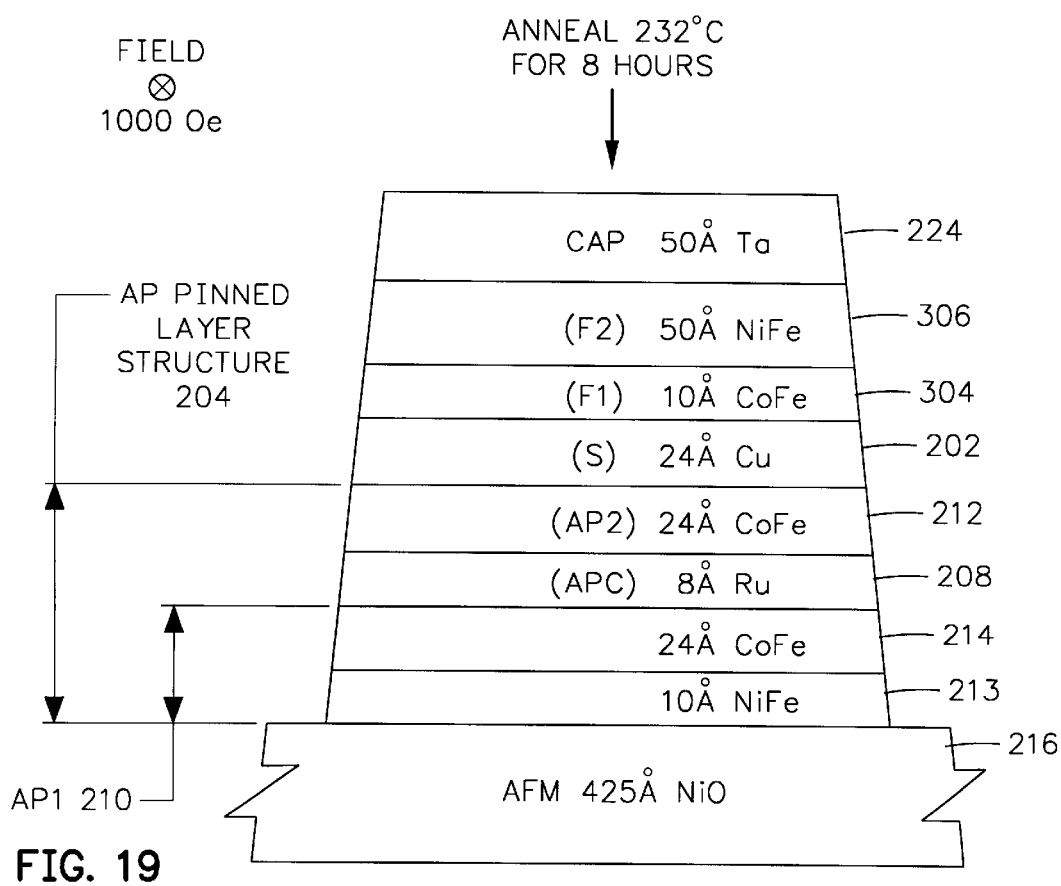
FIG. 19 shows the annealing of the spin valve sensor in FIG. 18 in the presence of a field oriented perpendicular to the ABS.

The spin valve sensor in FIG. 18 was subjected to annealing at 232° C. for a period of 8 hours, as shown in FIG. 19, in the presence of a field of 1000 Oe which was oriented perpendicular to the ABS. The uniaxial anisotropy field $H_K$ increased to 9.37 Oe, the easy axis coercivity $H_C$ increased to 2.3 Oe and the hard axis coercivity $H_{CH}$ increased to 0.58 Oe as shown in column 2 of Table II.

EXAMPLE 6

Figure 20:
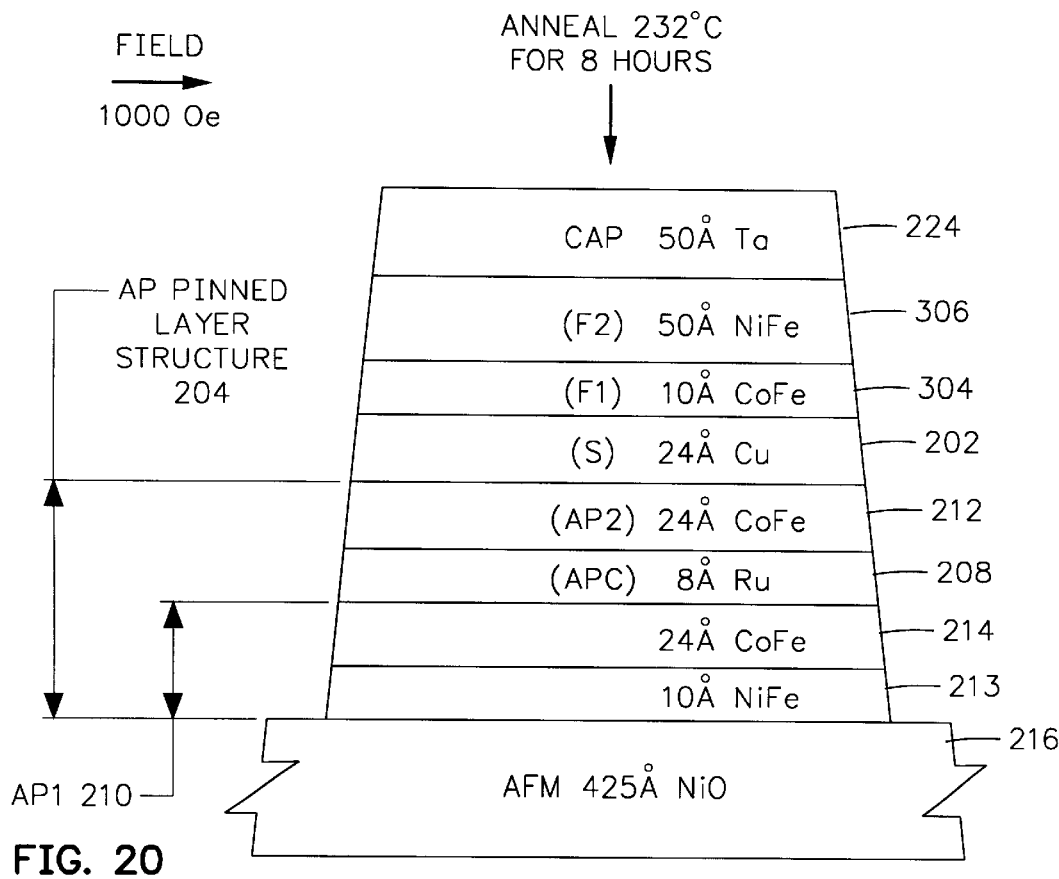
FIG. 20 shows the annealing of the spin valve sensor in FIG. 18 in the presence of a field oriented parallel to the ABS.

The spin valve sensor in FIG. 18 was subjected to annealing at 232° C. for a period of 8 hours, as shown in FIG. 20, in the presence of a field of 1000 Oe oriented parallel to the ABS. Example 6 had higher values than Example 4 in regard to the uniaxial anisotropy field $H_K$ of 8.56 Oe and the easy axis coercivity $H_C$ of 2.4 Oe and the hard axis coercivity $H_{CH}$ was less at 0.59 Oe, as shown in column 2 of Table III.

EXAMPLE 7

Figure 21:
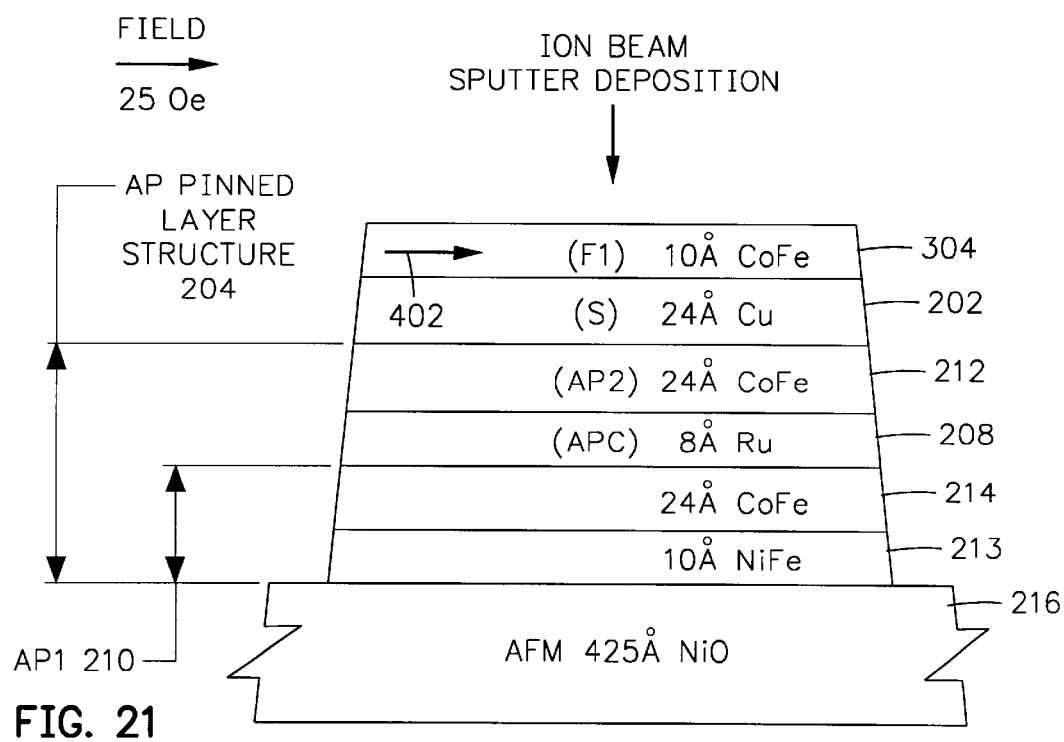
FIG. 21 shows the sputter deposition of the cobalt iron (CoFe) film of the free layer shown in FIG. 13 in the presence of a field oriented parallel to the ABS.
Figure 22:
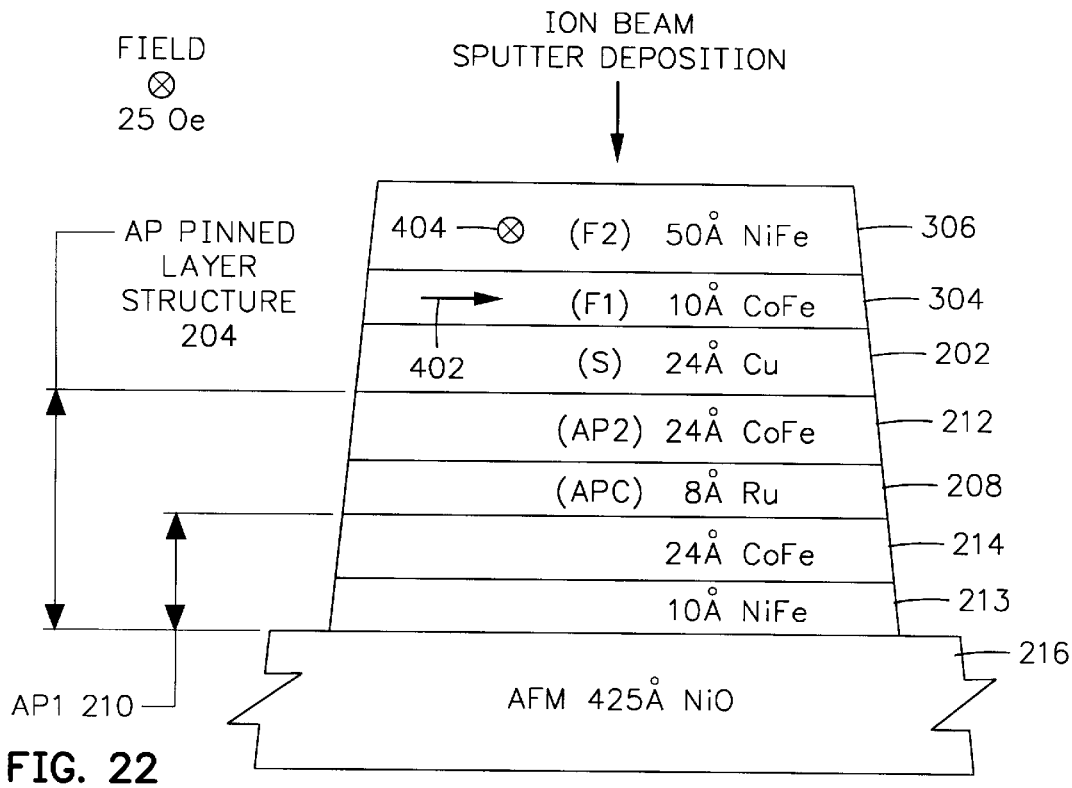
FIG. 22 shows the sputter deposition of the nickel iron (NiFe) film of the free layer shown in FIG. 21 in the presence of a field oriented perpendicular to the ABS.

In FIG. 21 the cobalt iron (CoFe) film 304 of the free layer of the spin valve sensor in FIG. 13 was sputter deposited in the presence of a field of 25 Oe which was oriented parallel to the ABS. The film 304 had an easy axis 402 which was oriented parallel to the ABS. As shown in FIG. 22 the nickel iron (NiFe) film 306 of the free layer was sputter deposited in the presence of a field of 25 Oe oriented perpendicular to the ABS. The film 306 had an easy axis 404 which was oriented perpendicular to the ABS. The uniaxial anisotropy field $H_K$ was 6.0 Oe, the easy axis coercivity $H_{CH}$ was 2.05 Oe and the hard axis coercivity $H_{CH}$ was 0.95 Oe, as shown in column 3 of Table I. It can be seen that these values are substantially the same as Example 4 which means that it makes little difference whether the cobalt iron (CoFe) film is sputter deposited in the presence of a field oriented perpendicular to the ABS or parallel to the ABS.

EXAMPLE 8

Figure 23:
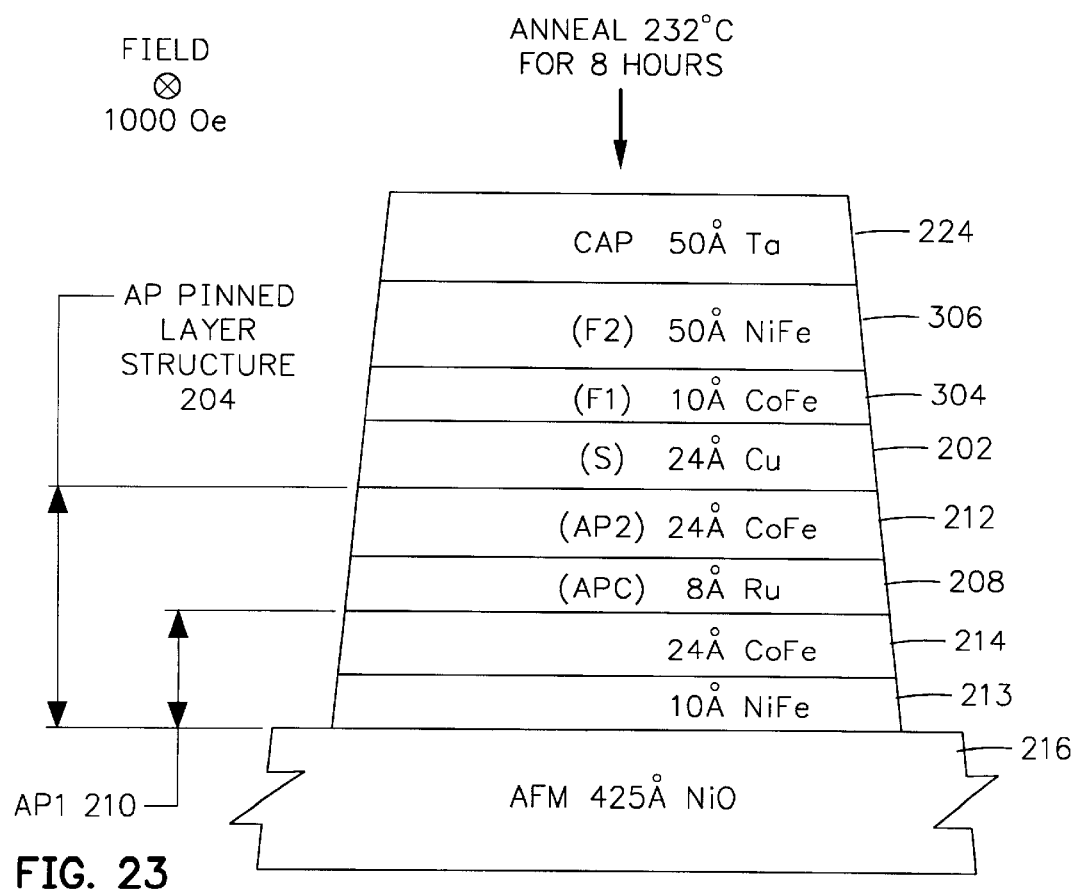
FIG. 23 shows the annealing of the spin valve sensor in FIG. 22 in the presence of a field oriented perpendicular to the ABS.

The spin valve sensor in FIG. 22 was subjected to annealing at 232° C. for a period of 8 hours, as shown in FIG. 23, in the presence of a field of 1000 Oe which was oriented perpendicular to the ABS. The uniaxial anisotropy field $H_K$ increased to 8.67 Oe, the easy axis coercivity $H_C$ increased to 2.4 Oe and the hard axis coercivity $H_{CH}$ decreased to 0.59 Oe, as shown in column 3 of Table II.

EXAMPLE 9

Figure 24:
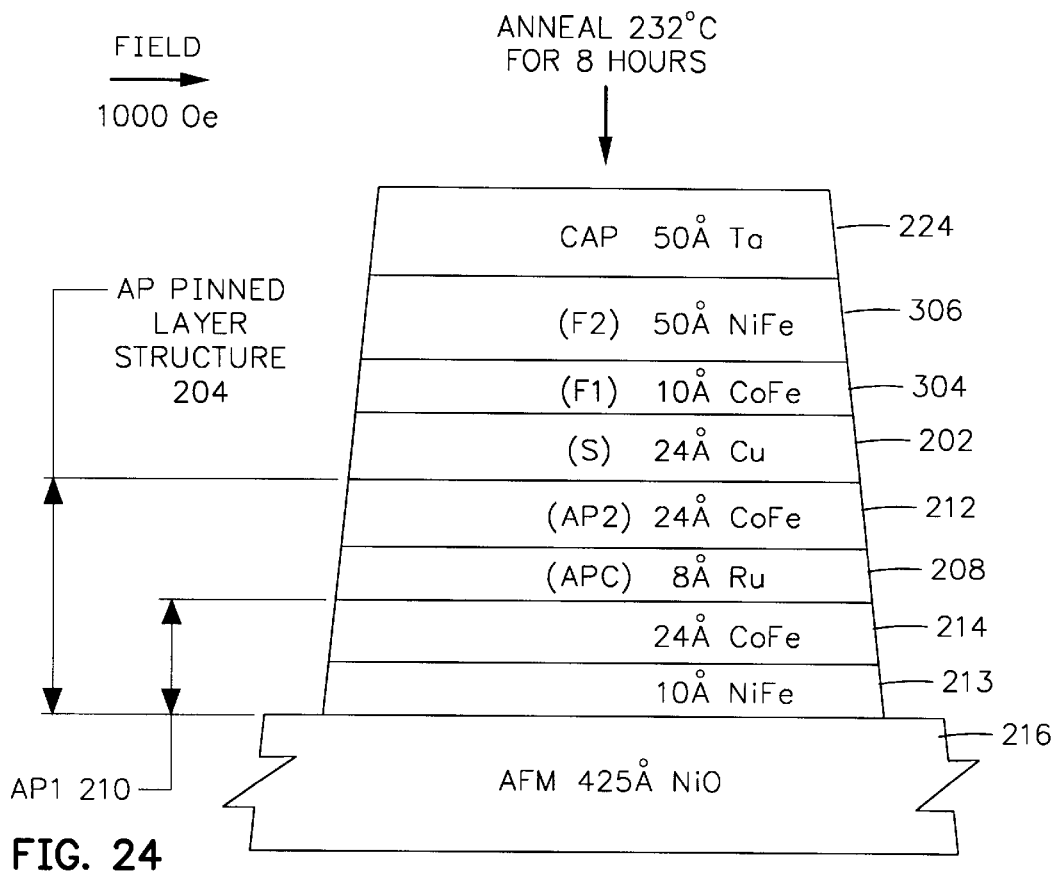
FIG. 24 shows the annealing of the spin valve sensor in FIG. 22 in the presence of a field oriented parallel to the ABS.

The spin valve sensor in FIG. 22 was annealed at a temperature of 232° C. for a period of 8 hours, as shown in FIG. 24, in the presence of a field of 1000 Oe oriented parallel to the ABS. The uniaxial anisotropy field $H_K$ increased to 7.75 Oe, the easy axis coercivity $H_C$ increased to 2.4 Oe and the hard axis coercivity $H_{CH}$ decreased to 0.55 Oe, as shown in column 3 of Table III as compared to Example 7.

EXAMPLE 10

First Embodiment of the Invention

Figure 25:
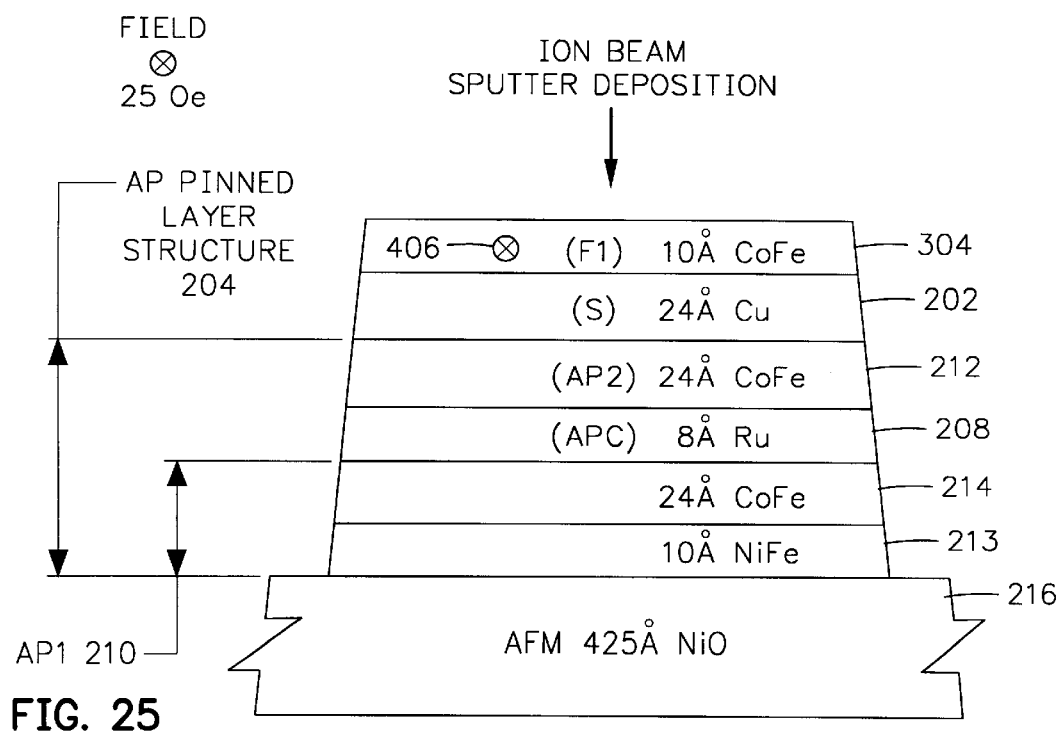
FIG. 25 shows the sputter deposition of the cobalt iron (CoFe) film of the free layer in FIG. 13 in the presence of a field oriented perpendicular to the ABS.
Figure 26:
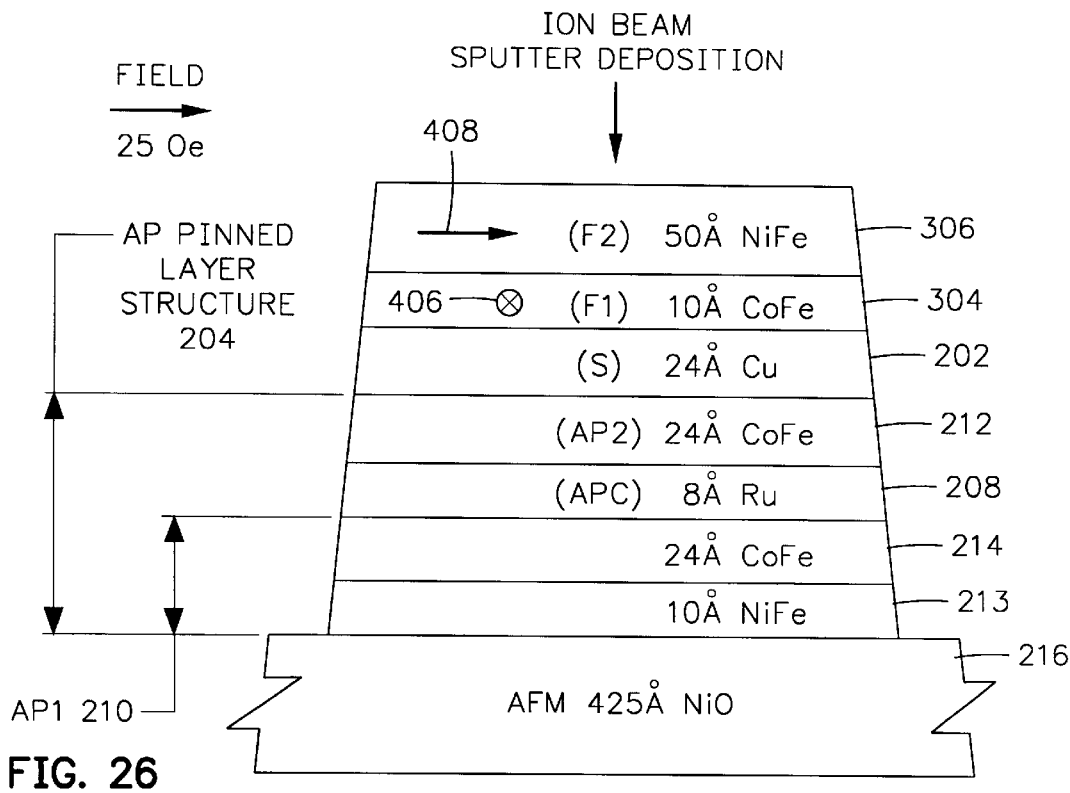
FIG. 26 shows the sputter deposition of the nickel iron (NiFe) film of the free layer in FIG. 25 in the presence of a field oriented parallel to the ABS.
Figure 27:
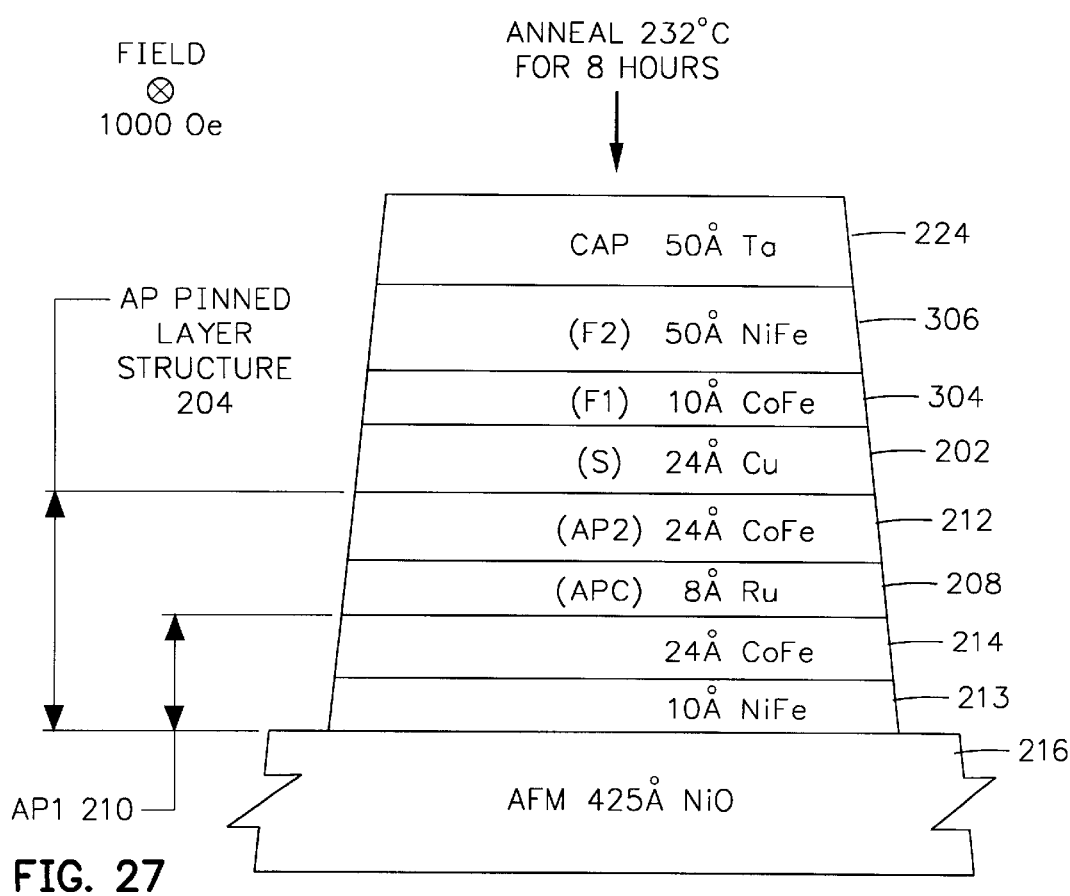
FIG. 27 shows the annealing of the spin valve sensor in FIG. 26 in the presence of a field oriented perpendicular to the ABS.

As shown in FIG. 25 the cobalt iron (CoFe) film of the free layer of the spin valve sensor in FIG. 13 was sputter deposited in the presence of a field of 25 Oe which was oriented perpendicular to the ABS. The easy axis 406 of the film 304 was perpendicular to the ABS. As shown in FIG. 26 a nickel iron (NiFe) film of the free layer was sputter deposited on the spin valve sensor in FIG. 25 in the presence of a field of 25 Oe which was oriented parallel to the ABS. The easy axis 408 of the film 306 was parallel to the ABS. The uniaxial anisotropy field $H_K$ was 8.96 Oe, the easy axis coercivity $H_C$ was 2.1 Oe and the hard axis coercivity $H_{CH}$ was 0.73 Oe, as shown in column 4 of Table I.

EXAMPLE 11

Second Embodiment of the Invention

The spin valve sensor in FIG. 26 was annealed at 232° C. for a period of 8 hours in the presence of a field of 1000 Oe which was oriented perpendicular to the ABS. The uniaxial anisotropy field $H_K$ was 5.3 Oe, the easy axis coercivity $H_C$ was 2.1 Oe and the hard axis coercivity $H_{CH}$ was 0.57 Oe, as shown in column 4 of Table II. It can be seen that after this annealing the uniaxial anisotropy field $H_K$ significantly decreased from 8.96 Oe in Example 10 to 5.3 Oe in the present example. This is a surprising result since the uniaxial anisotropy field $H_K$ normally increases after annealing. The easy axis coercivity $H_C$ remained the same as Example 10, however, the hard axis coercivity $H_{CH}$, discussed in the summary of the invention, significantly decreased from 0.73 Oe to 0.57 Oe. This means that the softness of the free layer and the stability of the spin valve sensor are significantly increased in the present example.

EXAMPLE 12

Figure 28:
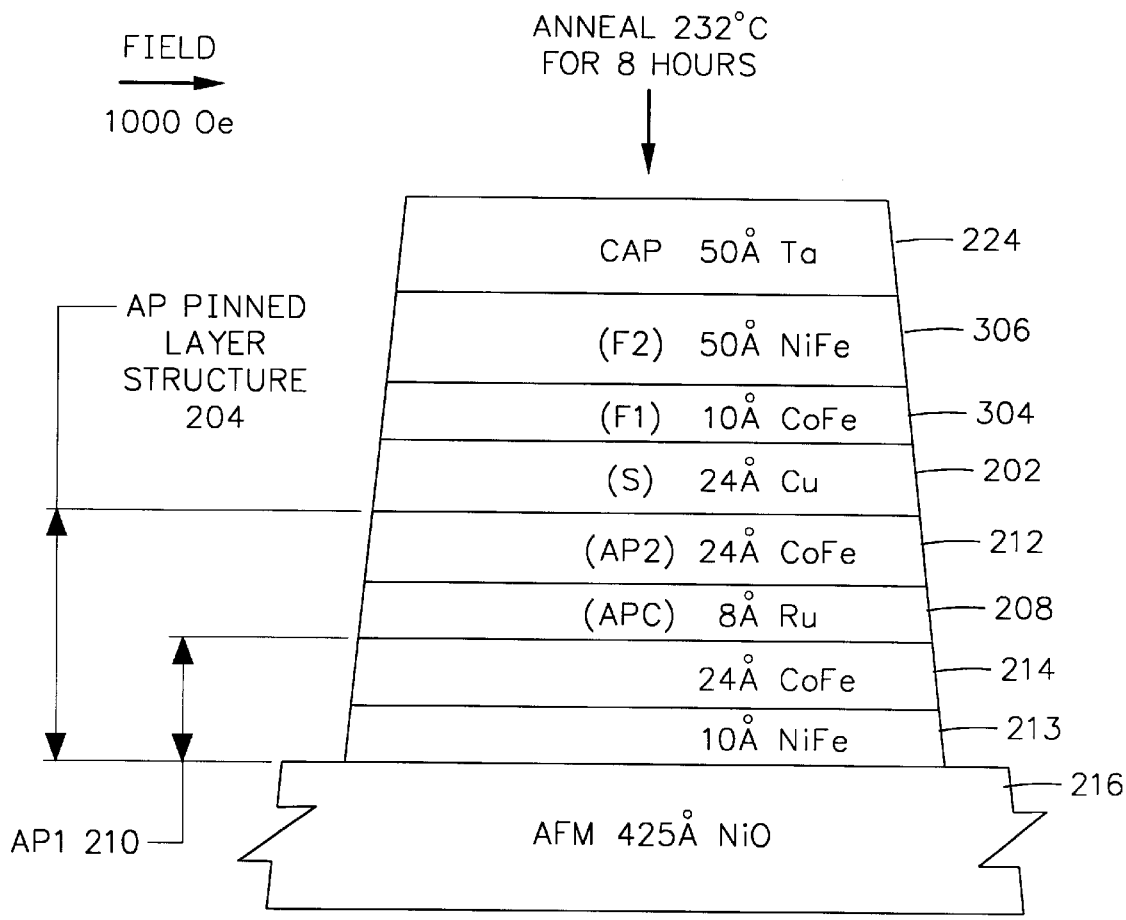
FIG. 28 shows the annealing of the spin valve sensor in FIG. 26 in the presence of a field oriented parallel to the ABS.

The spin valve sensor in FIG. 26 was subjected to annealing at a temperature of 232° C. for 8 hours, as shown in FIG. 28, in the presence of a field of 1000 Oe which was oriented parallel to the ABS. The uniaxial anisotropy field $H_K$ significantly increased, as compared to Example 10, from 8.96 Oe to 11.95 Oe. The easy axis coercivity $H_C$ stayed about the same at 2.5 Oe and the hard axis coercivity $H_{CH}$ stayed the same at about 0.72 Oe, as shown in column 4 of Table III.

TABLE I

As Deposited Easy Axis Directions (↑ ⊥ to ABS and → ∥ to ABS)

| | ↑<br>Cu/NiFe/Ta | ↑ ↑<br>Cu/CoFe/NiFe/Ta | → ↑<br>Cu/CoFe*/NiFe/Ta | ↑ →<br>Cu/CoFe/NiFe*/Ta |
|---|---|---|---|---|
| $H_K$ | 2.28 | 5.95 | 6 | 8.96 |
| $H_C$ | 1 | 2.1 | 2.05 | 2.1 |
| $H_{CH}$ | 0.33 | 0.95 | 0.95 | 0.73 |

TABLE II

Annealing With Field ⊥ to ABS

| | ↑<br>Cu/NiFe/Ta | ↑ ↑<br>Cu/CoFe/NiFe/Ta | → ↑<br>Cu/CoFe*/NiFe/Ta | ↑ →<br>Cu/CoFe/NiFe*/Ta |
|---|---|---|---|---|
| $H_K$ | 3.75 | 9.37 | 8.67 | 5.3 |
| $H_C$ | 1.1 | 2.3 | 2.4 | 2.1 |
| $H_{CH}$ | 0.3 | 0.58 | 0.59 | 0.57 |

TABLE III

Annealing With Field ∥ to ABS

| | ↑<br>Cu/NiFe/Ta | ↑ ↑<br>Cu/CoFe/NiFe/Ta | → ↑<br>Cu/CoFe*/NiFe/Ta | ↑ →<br>Cu/CoFe/NiFe*/Ta |
|---|---|---|---|---|
| $H_K$ | 2.75 | 8.56 | 7.75 | 11.95 |
| $H_C$ | 0.9 | 2.4 | 2.4 | 2.5 |
| $H_{CH}$ | 0.2 | 0.59 | 0.55 | 0.72 |

Method of the Invention

Figure 29:
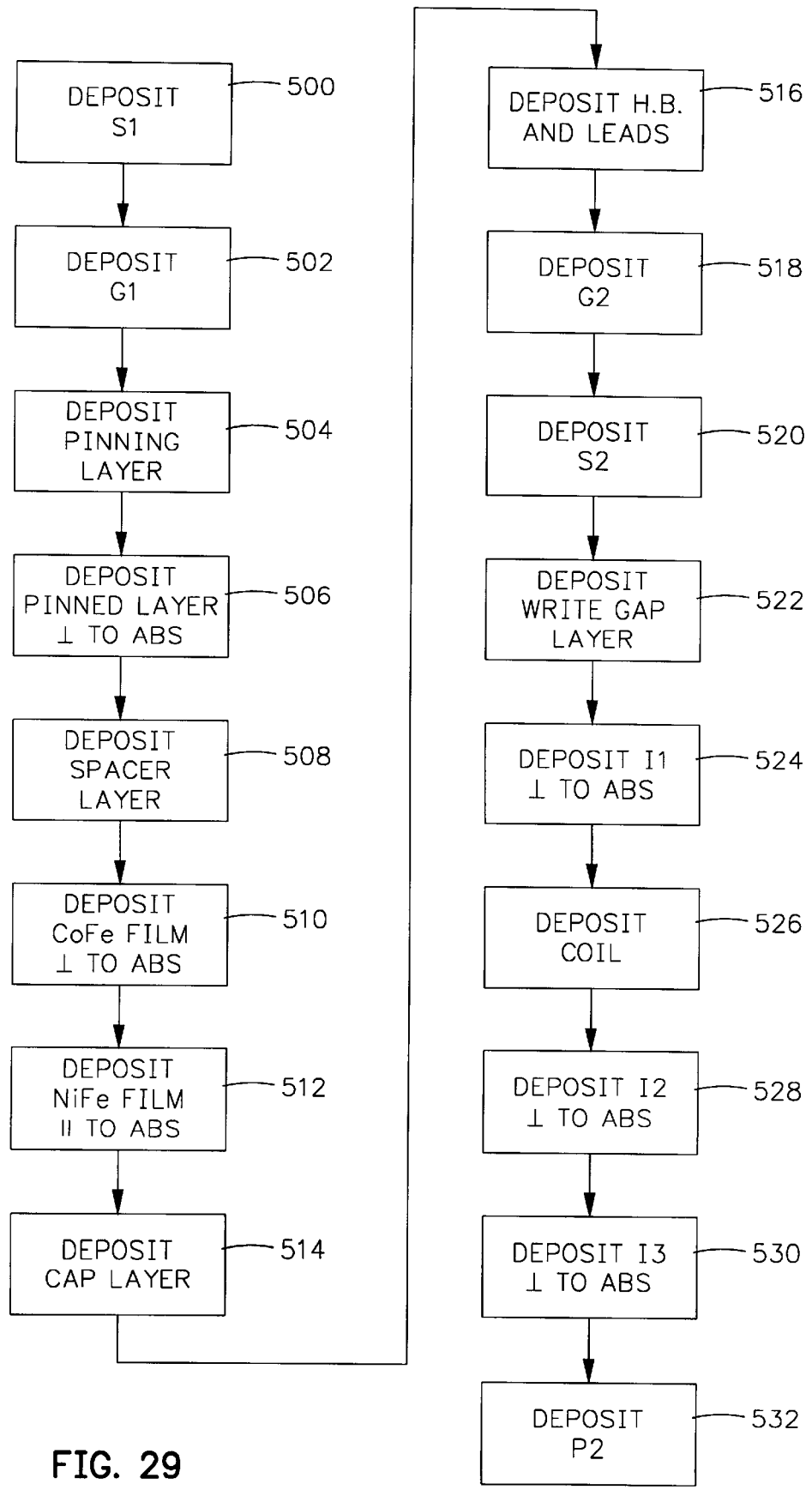
FIG. 29 is a block diagram of the various steps of the method of the present invention.

The method of the invention for making a complete magnetic head is illustrated in FIG. 29 with further reference to FIGS. 11 and 7. As shown in block 500, the first shield layer 152 of FIG. 11 may be formed by sputter deposition or plating, in block 502 the first read gap layer 148, which is typically aluminum oxide ($Al_2O_3$), is sputter deposited on the first shield layer; in block 504 the pinning layer 132, which may be nickel oxide (NiO) or another antiferromagnetic material, such as platinum manganese (PtMn) or nickel manganese (NiMn), is sputter deposited or plated on the first read gap layer; in block 506 the AP pinned layer structure 204, comprising films 213, 214, 208 and 212, are sputter deposited on the pinning layer 216, as shown in FIG. 13; in block 508 the copper (Cu) spacer layer 202 is sputter deposited on the AP pinned layer structure; in block 510 the cobalt iron film 304 of the free layer is sputter deposited on the spacer layer 202 with a magnetic field of 25 Oe oriented perpendicular to the ABS; in block 512 the nickel iron (NiFe) film 306 of the free layer is sputter deposited on the cobalt iron (CoFe) film 304 in the presence of a field of 25 Oe which is oriented parallel to the ABS and parallel to the major thin film planes of the layers of the spin valve sensor; in block 514 a tantalum (Ta) cap layer 224 is deposited on the free layer 302 by sputter deposition; in block 516 the first and second hard bias and lead layers 134 and 136, as shown in FIG. 11, are sputter deposited; in block 518 the second read gap layer 150 in FIG. 11 is sputter deposited on the spin valve sensor and the first and second lead layers; in block 520 the second shield layer 154 in FIG. 11, which may be a ferromagnetic material, is plated on the second read gap layer; in block 522 the write gap layer 102 in FIG. 7, which is typically aluminum oxide ($Al_2O_3$), is sputter deposited on the second shield layer; in block 524 the first insulation layer 86 in FIG. 7 is formed by spinning photoresist on the wafer and then baking the photoresist at a temperature of approximately 230° C. in the presence of a field which is oriented perpendicular to the ABS in the same direction as the magnetic moment 218 of the pinned layer in FIG. 13 for maintaining the orientation of the magnetic spins of the pinning layer 216; in block 526 the write coil 84, as shown in FIG. 7, is plated; in blocks 528 and 530 the second and third insulation layers 88 and 90 in FIG. 7 are sequentially spun and baked at approximately 230° C. in the presence of a field oriented perpendicular to the ABS in the same direction as the magnetic moment 218 of the first AP pinned layer so as to maintain the orientation of the magnetic spins of the pinning layer 216; and in block 532 the second pole piece layer 94 in FIG. 7 is plated. It should be understood that when a piggyback type of head is employed that additional layers 103 and 92 are formed, as shown in FIG. 6, after forming the second shield layer 82.

Discussion

The invention includes the embodiment described in Example 10 as well as its method of making. The invention further includes the embodiment described in Example 11 as well as the method of making. It should be understood that cobalt (Co) may be substituted for cobalt iron (CoFe) for the cobalt based film in the free layer, with similar improvements, as shown in Examples 10 and 11. Further, the invention is to also include a free layer which has a nickel iron film which is located between first and second cobalt based films. The cobalt iron (CoFe) in the examples was $Co_{90}Fe_{10}$ and the nickel iron (NiFe) was $Ni_{89}Fe_{21}$.

A broad concept of the present invention includes a first film of cobalt (Co) or cobalt iron (CoFe) which has an easy axis and a second film of nickel iron (NiFe) which has an easy axis wherein the easy axes of the first and second films are perpendicular to each other regardless of the location of the ABS or even in an application where an ABS is not involved such as a magnetic random access memory (MRAM) device. While Examples 10 and 11 are preferred embodiments, the invention also includes Examples 7 and 9.

Clearly, other embodiments and modifications of this invention will occur readily to those of ordinary skill in the art in view of these teachings. Therefore, this invention is to be limited only by the following claims, which include all such embodiments and modifications when viewed in conjunction with the above specification and accompanying drawings.

I claim:

1. A method of making a magnetic read head which has an air bearing surface (ABS), comprising the steps of:
    making a spin valve sensor comprising the steps of:
        forming a ferromagnetic pinned layer structure that has a magnetic moment;
        forming a pinning layer exchange coupled to the pinned layer structure for pinning the magnetic moment of the pinned layer structure;

forming a free layer;

forming a nonmagnetic conductive spacer layer between the free layer and the pinned layer structure;

forming the free layer with first and second free films wherein the first free film is composed of cobalt (Co) or cobalt iron (CoFe) and the second free film is composed of nickel iron (NiFe);

forming the first free film with a magnetic easy axis which is oriented perpendicular to a magnetic easy axis of the second free film; and annealing the first and second free films at a temperature sufficient to harden photoresist in the presence of a magnetic field oriented perpendicular to the ABS.

2. A method of making a magnetic read head as claimed in claim 1 including:

forming nonmagnetic nonconductive first and second read gap layers;

forming the spin valve sensor between the first and second read gap layers;

forming ferromagnetic first and second shield layers; and forming the first and second read gap layers between the first and second shield layers.

3. A method of making a magnetic read head as claimed in claim 2 wherein the first free film is formed of cobalt iron (CoFe).

4. A method of making a magnetic read head as claimed in claim 3 wherein the first free film is formed to interface the spacer layer.

5. A method of making a magnetic read head as claimed in claim 4 wherein the easy axis of the second free film is formed parallel to a major thin film surface plane of the second free film.

6. A method of making a magnetic read head as claimed in claim 5 wherein a forming of the pinned layer structure comprises the steps of:

forming ferromagnetic first and second antiparallel (AP) pinned layers with the first AP layer interfacing the pinning layer; and forming an antiparallel (AP) coupling layer between the first and second AP layers.

7. A method of making magnetic head assembly that has an air bearing surface (ABS), comprising the steps of:

making a write head including the steps of:

forming ferromagnetic first and second pole piece layers in pole tip, yoke and back gap regions wherein the yoke region is located between the pole tip and back gap regions;

forming a nonmagnetic nonconductive write gap layer between the first and second pole piece layers in the pole tip region;

forming an insulation stack with at least one coil layer embedded therein between the first and second pole piece layers in the yoke region; and connecting the first and pole piece layers at said back gap region; and making a read head including the steps of:

forming nonmagnetic nonconductive first and second read gap layers;

forming a spin valve sensor between the first and second read gap layers;

forming the first and second read gap layers between the first shield layer and the first pole piece layer; and a making of the spin valve sensor comprising the steps of:

forming a ferromagnetic pinned layer structure that has a magnetic moment;

forming a pinning layer exchange coupled to the pinned layer structure for pinning the magnetic moment of the pinned layer structure;

forming a free layer;

forming a nonmagnetic conductive spacer layer between the free layer and the pinned layer structure;

forming the free layer with first and second free films wherein the first free film is composed of cobalt (Co) or cobalt iron (CoFe) and the second free film is composed of nickel iron (NiFe);

forming the first free film with a magnetic easy axis which is oriented perpendicular to the ABS and forming the second free film with a magnetic easy axis which is oriented parallel to the ABS; and annealing the first and second free films at a temperature sufficient to harden photoresist in the presence of a magnetic field oriented perpendicular to the ABS.

8. A method of making magnetic head assembly as claimed in claim 7 including:

forming a ferromagnetic second shield layer; and forming a nonmagnetic isolation layer between the second shield layer and the first pole piece layer.

9. A method of making magnetic head assembly as claimed in claim 7 wherein the temperature of annealing about 230° C. and the magnetic field is about 1,000 Oe.

10. A method of making magnetic head assembly as claimed in claim 7 wherein the first free film is formed of cobalt iron (CoFe).

11. A method of making magnetic head assembly as claimed in claim 10 wherein the first free film is formed to interface the spacer layer.

12. A method of making magnetic head assembly as claimed in claim 11 wherein the easy axis of the second free film is formed parallel to a major thin film surface plane of the second free film.

13. A method of making magnetic head assembly as claimed in claim 12 wherein a forming of the pinned layer structure comprises the steps of:

forming ferromagnetic first and second antiparallel (AP) pinned layers with the first AP layer interfacing the pinning layer; and forming an antiparallel (AP) coupling layer between the first and second AP layers.

* * * * *